US012335621B2

(12) United States Patent
Hwang et al.

(10) Patent No.: US 12,335,621 B2
(45) Date of Patent: Jun. 17, 2025

(54) IMAGE CAPTURING METHOD USING WIRELESS COMMUNICATION AND ELECTRONIC DEVICE SUPPORTING SAME

(71) Applicant: Samsung Electronics Co., Ltd., Suwon-si (KR)

(72) Inventors: Miseon Hwang, Suwon-si (KR); Eunhye Kim, Suwon-si (KR); Kangmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 18/188,139

(22) Filed: Mar. 22, 2023

(65) Prior Publication Data

US 2023/0232106 A1    Jul. 20, 2023

Related U.S. Application Data

(63) Continuation of application No. PCT/KR2021/012806, filed on Sep. 17, 2021.

(30) Foreign Application Priority Data

Sep. 22, 2020   (KR) .................. 10-2020-0122513

(51) Int. Cl.
  *H04N 23/69*    (2023.01)
  *H04N 23/63*    (2023.01)
  (Continued)

(52) U.S. Cl.
  CPC .......... *H04N 23/69* (2023.01); *H04N 23/632* (2023.01); *H04N 23/633* (2023.01); *H04N 23/667* (2023.01); *H04W 4/027* (2013.01)

(58) Field of Classification Search
  None
  See application file for complete search history.

(56) References Cited

U.S. PATENT DOCUMENTS 7,373,109 B2 *  5/2008  Pohja ...................... G06F 16/48
                                              455/456.6
8,228,383 B2    7/2012  Sugiura
                (Continued)

FOREIGN PATENT DOCUMENTS

CN    107211216 A    9/2017
JP    4058352 B2     3/2008
              (Continued)

OTHER PUBLICATIONS

Lee et al., UWB positioning technology introduction and technology trend, The Journal of The Korean Institute of Communication Sciences, 2017.

*Primary Examiner* — Cynthia Segura
(74) *Attorney, Agent, or Firm* — Jefferson IP Law, LLP

(57) ABSTRACT

An electronic device is provided. The electronic device includes a communication circuit, a memory, at least one camera, and a processor operatively connected to the communication circuit, the memory, and the at least one camera and is configured to obtain information related to the location of at least one external electronic device on the basis of a signal received from the at least one external electronic device via the communication circuit, receive information of a subject related to the at least one external electronic device from the at least one external electronic device via the communication circuit, and configure image capturing information of the at least one camera on the basis of the information related to the location of the external electronic device and the information of the subject.

20 Claims, 13 Drawing Sheets

(51) Int. Cl.
*H04N 23/667* (2023.01)
*H04W 4/02* (2018.01)

(56) References Cited

U.S. PATENT DOCUMENTS

| | | | | |
|---|---|---|---|---|
| 10,523,859 | B2* | 12/2019 | Lee | H04N 23/662 |
| 11,102,409 | B2 | 8/2021 | An | |
| 2003/0197612 | A1* | 10/2003 | Tanaka | G08B 13/2462 340/8.1 |
| 2004/0135905 | A1 | 7/2004 | Suda | |
| 2006/0066723 | A1* | 3/2006 | Iwase | H04N 23/662 348/E7.086 |
| 2010/0311347 | A1* | 12/2010 | Le Thierry D'Ennequin | H04W 8/005 455/67.11 |
| 2011/0013032 | A1* | 1/2011 | Hatanaka | H04N 23/66 348/E5.042 |
| 2012/0105647 | A1 | 5/2012 | Yoshizumi | |
| 2013/0027569 | A1* | 1/2013 | Parulski | H04N 23/611 348/207.1 |
| 2016/0183024 | A1 | 6/2016 | Karkkainen et al. | |
| 2017/0123041 | A1 | 5/2017 | Bae et al. | |
| 2017/0353753 | A1 | 12/2017 | Ozawa | |
| 2018/0054606 | A1 | 2/2018 | Hwang et al. | |
| 2018/0077335 | A1* | 3/2018 | Lee | G06T 7/70 |
| 2018/0275685 | A1 | 9/2018 | Kim et al. | |
| 2019/0222740 | A1 | 7/2019 | Kitagawa | |
| 2019/0268534 | A1 | 8/2019 | Li | |

FOREIGN PATENT DOCUMENTS

| | | |
|---|---|---|
| JP | 5695335 B2 | 4/2015 |
| JP | 2019-134389 A | 8/2019 |
| KR | 10-2012-0038451 A | 4/2012 |
| KR | 10-2015-0141057 A | 12/2015 |
| KR | 10-2016-0028651 A | 3/2016 |
| KR | 10-1802764 B1 | 11/2017 |
| KR | 10-2017-0143224 A | 12/2017 |
| KR | 10-2018-0082757 A | 7/2018 |
| KR | 10-2018-0106197 A | 10/2018 |
| KR | 10-2019-0007128 A | 1/2019 |
| KR | 10-2086348 B1 | 3/2020 |
| KR | 10-2020-0043818 A | 4/2020 |
| KR | 10-2021-0030785 A | 3/2021 |

* cited by examiner

| | Category | Subcategory | Angle of view (1131) | Shutter speed (1132) | ISO (1133) | Exposure (1134) | Filter (1135) | Aperture (1136) |
|---|---|---|---|---|---|---|---|---|
| 1111 | Type of subject | Adult | - | - | - | - | Ivory | Low(F1.5) |
| | | Child | - | - | - | - | Lolli | Low(F1.5) |
| | | Animal | - | - | - | - | Blossom | Normal(F2.4) |
| | | Object (vehicle) | - | - | - | - | Cool | Normal(F2.4) |
| 1112 | Size of subject (diagonal length m) | Large (3m or greater) | Wide angle | - | - | - | - | - |
| | | Medium (1m or greater) | standard | - | - | - | - | - |
| | | Small (less than 1m) | Telephoto | - | - | - | - | - |
| 1113 | Color of subject | Bright color | - | - | Low | -1 | - | - |
| | | Intermediate color | - | - | Normal | 0 | - | - |
| | | Dark color | - | - | High | +1 | - | - |
| 1114 | Movement information (speed) of subject km/h | Fast (7km/h OR greater) | Wide angle | 1/1000 or less | High | - | - | Normal(F2.4) |
| | | Moderate (3km/h or greater) | standard | 1/200 or less | Normal | - | - | Normal(F2.4) |
| | | Slow (less than 3km/h) | standard | | Normal | - | - | Low(F1.5) |
| 1115 | Location of subject | Stop | Telephoto | | Low | - | - | Low(F1.5) |

1137: Change in angle of view according to location is variable depending on size and distance of subject
Angle of view (°) = 2×180×PI×tan⁻¹(diagonal length of subject(m)/(2×distance from camera to subject(m)))

FIG. 11

IMAGE CAPTURING METHOD USING WIRELESS COMMUNICATION AND ELECTRONIC DEVICE SUPPORTING SAME

CROSS-REFERENCE TO RELATED APPLICATION(S)

This application is a continuation application, claiming priority under § 365 (c), of an International Application No. PCT/KR2021/012806, filed on Sep. 17, 2021, which is based on and claims the benefit of a Korean patent application number 10-2020-0122513, filed on Sep. 22, 2020, in the Korean Intellectual Property Office, the disclosure of which is incorporated by reference herein in its entirety.

BACKGROUND

1. Field

The disclosure relates to image capturing technology using wireless communication.

2. Description of Related Art

Recently, electronic devices equipped with cameras, such as digital cameras, digital camcorders, or smartphones, are being actively spread. The electronic device equipped with the camera may provide an image capturing function. For example, the electronic device may output a preview screen on a display using an image acquired in real time from the camera, and acquire a captured image from the camera when an image capturing input is received.

The above information is presented as background information only to assist with an understanding of the disclosure. No determination has been made, and no assertion is made, as to whether any of the above might be applicable as prior art with regard to the disclosure.

SUMMARY

When a subject to be captured is moving, it is necessary for a user to capture images of the moving subject by directly changing an image capturing direction of a camera or changing an angle of view (e.g., a normal {standard} angle or a wide or narrow angle {telephoto angle}) of the camera, so that there was inconvenience in using the camera. In order to reduce this inconvenience, existing electronic devices have provided a method of recognizing a user's body part (e.g., face) through image processing and tracking the recognized body part, but when the subject's movement exceeds a designated speed, a recognition rate for the body part is low, and the quality of a captured image may be degraded.

Aspects of the disclosure are to address at least the above-mentioned problems and/or disadvantages and to provide at least the advantages described below. Accordingly, an aspect of the disclosure is to provide an image capturing method using wireless communication that configures image capturing information for capturing a subject based on a signal received from an external electronic device related to the subject through wireless communication, and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a communication circuit, a memory, at least one camera, and a processor configured to be operatively connected to the communication circuit, the memory, and the at least one camera, wherein the processor may be configured to acquire information related to the location of at least one external electronic device based on a signal received from the at least one external electronic device, receive information of a subject related to the at least one external electronic device from the at least one external electronic device through the communication circuit, and configure image capturing information of the at least one camera based on the information related to the location of the external electronic device and the information of the subject.

In accordance with another aspect of the disclosure, an image capturing method using wireless communication of an electronic device is provided. The image capturing method includes acquiring information related to the location of at least one external electronic device based on a signal received from the at least one external electronic device through a communication circuit of the electronic device, receiving information of a subject related to the at least one external electronic device from the at least one external electronic device through the communication circuit, and configuring image capturing information of at least one camera included in the electronic device based on the information related to the location of the external electronic device and the information of the subject.

According to various embodiments of the disclosure, the location of a subject may be identified based on a signal received from an external electronic device related to the subject through wireless communication, and a display object corresponding to the identified subject may be provided, thereby increasing convenience for selecting the subject.

In addition, according to various embodiments of the disclosure, the movement of a subject may be determined based on a signal received from an external electronic device related to the subject through wireless communication, and image capturing information of a camera may be automatically configured according to the determined movement of the subject, thereby supporting acquisition of a high-quality captured image while providing convenience in using the camera.

In addition, according to various embodiments of the disclosure, information of a subject may be acquired based on a signal received from an external electronic device related to the subject through wireless communication, and image capturing information suitable for the subject may be acquired based on the acquired information of the subject, thereby supporting acquisition of a high-quality captured image.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a diagram illustrating a method of configuring image capturing information of a camera according to an embodiment of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
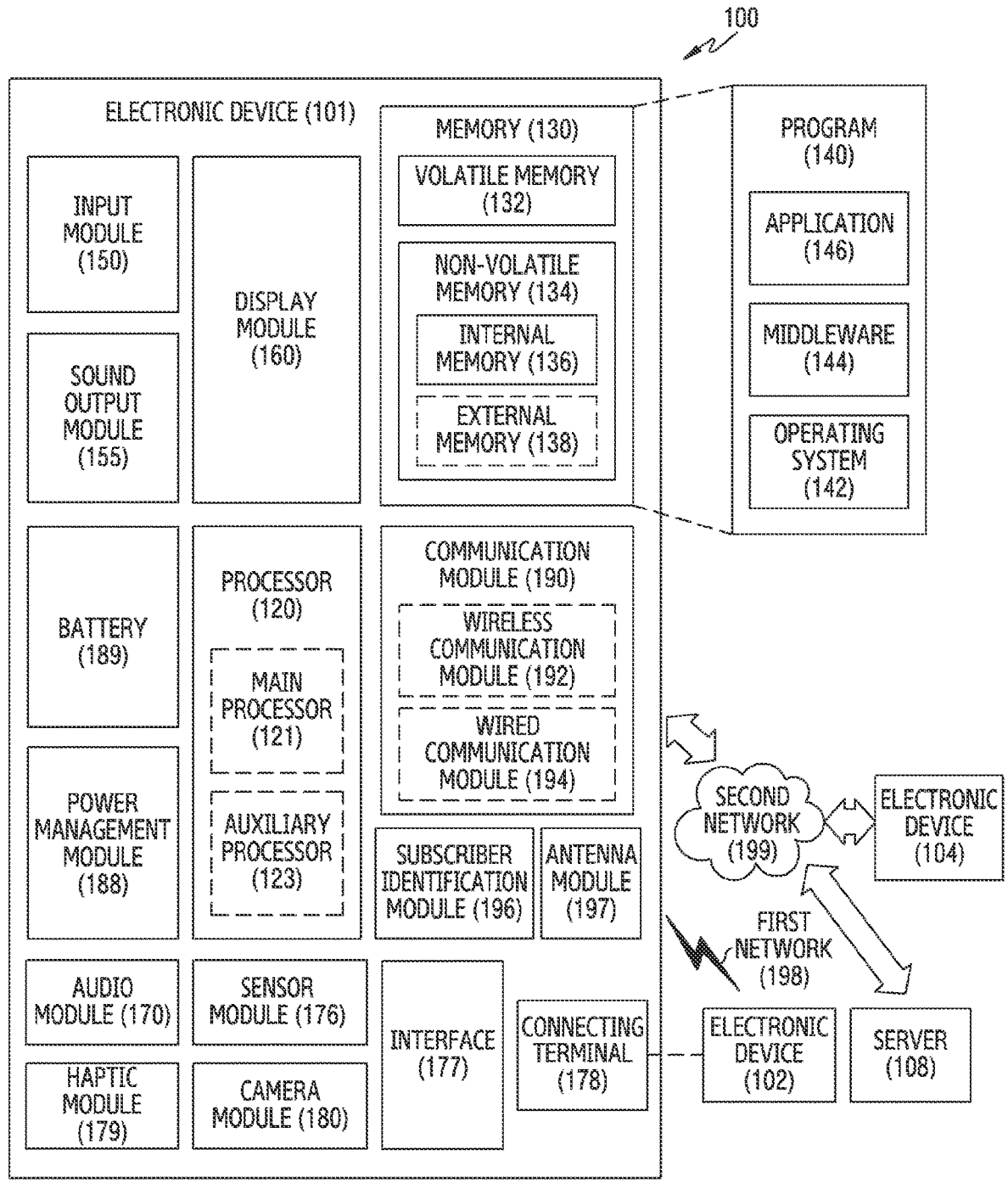
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
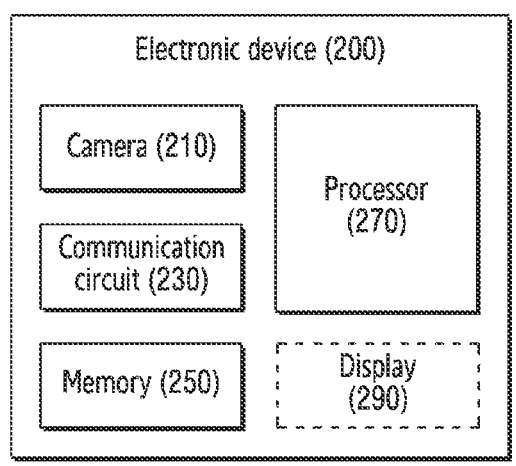
FIG. 2 is a diagram illustrating the configuration of an electronic device providing an image capturing function using wireless communication according to an embodiment of the disclosure.

FIG. 2 is a diagram illustrating the configuration of an electronic device that provides an image capturing function using wireless communication according to an embodiment of the disclosure.

An electronic device 200 (e.g., the electronic device 101 of FIG. 1) may use a camera 210 (e.g., the camera module 180 of FIG. 1) to provide an image capturing function. The electronic device 200 may configure image capturing information for capturing a subject based on a signal received from an external electronic device (e.g., the electronic device 102 or the electronic device 104 of FIG. 1) attached to or worn on the subject through a communication circuit 230. Accordingly, even when a subject to be captured moves during image capturing using the camera 210, the electronic device 200 may determine the movement of the subject based on the received signal, and may automatically configure image capturing information of the camera according to the determined movement of the subject, thereby supporting acquisition of a high-quality captured image while providing convenience for use of the camera 210.

Referring to FIG. 2, the electronic device 200 for providing the above functions may include the camera 210, the communication circuit 230 (e.g., the communication module 190 of FIG. 1), a memory 250 (e.g., the memory 130 of FIG. 1), and a processor 270 (e.g., the processor 120 of FIG. 1). However, the configuration of the electronic device 200 is not limited thereto. According to various embodiments, the electronic device 200 may further include at least one other component in addition to the above-described components. For example, the electronic device 200 may further include a display 290.

The camera 210 may capture still images and moving images. To this end, the camera 210 may include an imaging device. The imaging device may include, for example, at least one of a lens that receives image light of a subject to form an image, an aperture that controls the amount of light passing through the lens, a shutter that opens and closes the aperture so that an image sensor is exposed by light passing through the lens for a predetermined time, the image sensor that receives the image formed on the lens as an optical signal, and an internal memory.

According to an embodiment, the camera 210 may include a plurality of cameras. The plurality of cameras may be disposed on at least one surface of a housing of the electronic device 200. For example, at least one of the plurality of cameras may be disposed on the front surface of the housing, and at least one other of the plurality of cameras may be disposed on the rear surface of the housing.

According to an embodiment, at least some of the plurality of cameras may have different angles of view. For example, some of the plurality of cameras may have a first angle of view (or a normal angle {standard angle}) (e.g., about 79 degrees), others thereof may have a second angle of view (or a wide angle) (e.g., 120 degrees) greater than the first angle of view, and the others thereof may have an angle of view (or a narrow angle {telephoto angle}) (e.g., 24 degrees) smaller than the first angle of view. Even when there is only one camera 210, the camera 210 may provide a plurality of angles of view. For example, the camera 210 may provide at least one of the first angle of view, the second angle of view, and the third angle of view through a zoom-in/zoom-out function.

The communication circuit 230 may support communication between the electronic device 200 and an external electronic device. For example, the communication circuit 230 may establish wireless communication with an external electronic device according to a prescribed communication protocol, and transmit/receive signals or data using a frequency band supported by the wireless communication. The wireless communication may include, for example, at least one of ultra-wideband (UWB) communication, Wi-Fi communication, WiGig communication, Bluetooth™ (BT) communication, or Bluetooth™ low energy (BLE) communication.

The memory 250 may store a variety of data used by at least one component of the electronic device 200. According to an embodiment, the memory 250 may store data or instructions used by a process executed by the processor 270 or an application program. According to an embodiment, the memory 250 may store information on a subject received through the communication circuit 230.

The processor 270 may control at least one other component of the electronic device 200 and may perform various data processing or calculations. According to an embodiment, the processor 270 may execute instructions for controlling operations of the camera 210, the communication circuit 230, the memory 250, and/or the display 290.

According to an embodiment, the processor 270 may display a display object corresponding to the at least one external electronic device connected through the communication circuit 230 on the display 290. The display object may include, for example, at least one of text, image, or icon for identifying the at least one external electronic device. For example, the display object may include an identifier (e.g., name) or image (e.g., face image) of a subject related to the at least one external electronic device. According to an embodiment, when there are a plurality of external electronic devices connected through the communication circuit 230, the processor 270 may display a display object corresponding to each of the plurality of external electronic devices on the display 290.

In various embodiments of the document, the fact that the at least one external electronic device is related to the subject may mean a state in which the at least one external electronic device is attached to or worn on the subject.

According to an embodiment, when the display object displayed on the display 290 is selected (e.g., a touch input occurs at a location where the display object is displayed on the display 290), the processor 270 may select a subject related to the external electronic device corresponding to the selected display object as a capturing target. According to an embodiment, when at least one display object is selected from a plurality of display objects while the plurality of display objects are displayed on the display 290, the processor 270 may select the subject related to the at least one external electronic device corresponding to the at least one selected display object as the capturing target. For example, when two or more display objects are selected, the processor 270 may select two or more subjects related to the external electronic device corresponding to each of the two or more display objects as the capturing target.

According to an embodiment, the processor 270 may acquire information related to the location of the at least one external electronic device based on a signal received from the at least one external electronic device through the communication circuit 230. Here, the at least one external electronic device may be an electronic device related to the subject selected as the capturing target. When the communication circuit 230 supports UWB communication, the processor 270 may measure the location of the at least one external electronic device through a ranging operation using UWB communication. For example, the processor 270 may acquire (or calculate) the location of the at least one external electronic device using an angle of arrival (AoA) of the signal received from the at least one external electronic device. According to an embodiment, the AoA of the signal may be acquired (or calculated) using a distance between antennas receiving the signal and a phase difference of arrival (PDoA) of the signal received from each of the antennas. The UWB communication may refer to short-distance high-speed wireless communication using a wide frequency band, a low spectral density, and a short pulse width in a baseband state. For example, the frequency band of the UWB communication may include a 3 GHz band (e.g., about 3.735 GHz to 4.8 GHZ), a 7 GHz band (e.g., about 7.2 GHz to 10.2 GHZ), and/or a 6 GHz band (e.g., about 6.0 GHz to 7.2 GHz).

According to an embodiment, the processor 270 may determine (or track) the movement of the external electronic device related to at least one subject selected as the capturing target. For example, the processor 270 may acquire movement information of the external electronic device based on the signal received from the external electronic device through the communication circuit 230. The processor 270 may acquire the movement information of the external electronic device using, for example, a first location of the external electronic device determined based on a first signal received from the external electronic device through the communication circuit 230 and a second location of the external electronic device determined based on a second signal received from the external electronic device through the communication circuit 230. To this end, the processor 270 may receive the signal from the external electronic device through the communication circuit 230 at a designated time period. Here, the movement information may include, for example, information about a movement direction and a movement speed. As another example, the processor 270 may receive the movement information according to a change in the location of the external electronic device from the external electronic device through the communication circuit 230. For example, the external electronic device may include a sensor (e.g., an acceleration sensor or a global positioning system (GPS) sensor) capable of detecting the movement of the external electronic device, and the movement information of the external electronic device measured through the sensor may be transmitted to the electronic device 200.

According to an embodiment, the processor 270 may receive information on the subject related to the at least one external electronic device from the at least one external electronic device through the communication circuit 230. The information on the subject may include profile information of the subject. The profile information of the subject may include, for example, at least one of a type of the subject (e.g., person {adult or child}, animal, or object), an identifier of the subject (e.g., name or phone number), a size of the subject (e.g., horizontal length {shoulder width}, vertical length {height}, or diagonal length), a color of the subject (e.g., skin tone), or a type of a filter applied (e.g., preferred) when the subjected is captured.

According to an embodiment, the processor 270 may configure image capturing information of at least one camera 210 based on the location of the external electronic device related to the at least one subject selected as the capturing target and information of the at least one subject. The image capturing information may include, for example, at least one of an angle of view of the camera 210, a shutter speed of the camera 210, an ISO sensitivity of the camera 210, an exposure value of the camera 210, an aperture value of the camera 210, or a type of the filter of the camera 210.

According to an embodiment, the processor 270 may configure the angle of view included in the image capturing information based on the location of the external electronic device related to the at least one subject selected as the capturing target and the size of the at least one subject included in the information of the at least one subject. The processor 270 may configure the angle of view of the camera 210 to be a greater angle as a separation distance between the electronic device 200 and the external electronic device, which is determined based on the location of the external electronic device, is smaller and the size of the subject is larger. For example, when the separation distance between the electronic device 200 and the external electronic device is less than a designated value, the processor 270 may determine that the subjected to be captured is close and configure the angle of view of the camera 210 to be a wide angle. When the separation distance between the electronic device 200 and the external electronic device is greater than or equal to the designated value, the processor 270 may determine that the subject to be captured is far away and configure the angle of view of the camera 210 to be a narrow angle (telephoto angle). As another example, the processor 270 may configure the angle of view of the camera 210 to be a wide angle when the size of the subject is greater than or equal to a designated size, and may configure the angle of view of the camera 210 to be a narrow angle (telephoto angle) when the size of the subject is less than the designated size.

According to an embodiment, the processor 270 may acquire (or calculate) a size of a capturing area for capturing the at least one subject based on the location of the external electronic device related to the at least one subject selected as the capturing target and the size of the at least one subject included in the information on the at least one subject, and may configure the angle of view included in the image capturing information based on the size of the acquired capturing area. The capturing area may be an area including the at least one subject when the at least one subject is viewed from the location of the electronic device 200, and a diagonal length of the at least one subject may correspond to a diagonal length of the capturing area. When there are a plurality of subjects selected as the capturing target, the diagonal length of the capturing area may be configured to correspond to a diagonal length in which the sizes of the plurality of subjects and a separation distance between the subjects are reflected so that the plurality of subjects are all included in the capturing area.

According to an embodiment, when the electronic device 200 includes a plurality of cameras 210 having different angle views, the processor 270 may select an angle of view for capturing the at least one subject based on the location of the external electronic device related to the at least one subject selected as the capturing target and the size of the at least one subject included in the information of the at least one subject, and may select the camera 210 corresponding to the selected angle of view among the plurality of cameras 210 as a camera for capturing the at least one subject. For example, the processor 270 may select a first camera having a wide angle of view among the plurality of cameras 210 when the size of the subject is greater than or equal to a designated size, and may select a second camera having a narrow angle of view (telephoto angle) among the plurality of cameras 210 when the size of the subject is less than the designated size.

According to an embodiment, the processor 270 may configure at least one of the aperture value of the camera 210 or the type of the filter of the camera 210 included in the image capturing information based on the type of the at least one subject included in the information of the at least one subject selected as the capturing target. For example, when the type of the subject is determined to be an adult, the processor 270 may configure the aperture value of the camera 210 to be a low value (e.g., F1.5) and may configure the filter of the camera 210 to be a first filter (e.g., Ivory filter). For another example, when the type of the subject is determined to be a child, the processor 270 may configure the aperture value of the camera 210 to be a low value (e.g., F1.5) and may configure the filter of the camera 210 to be a second filter (e.g., Lolli filter). For another example, when the type of the subject is determined to be an animal, the processor 270 may configure the aperture value of the camera 210 to be a default value (e.g., F2.4) and may configure the type of the camera 210 to be a third filter (e.g., Blossom filter). For another example, when the type of the subject is determined to be an object (e.g., a vehicle), the processor 270 may configure the aperture value of the camera 210 to be a default value (e.g., F2.4) and may configure the filter of the camera 210 to be a fourth filter (e.g., Cool filter). The types of the filters in the above description are described as examples and are not limited thereto. According to various embodiments, the type of various filters supported by an image capturing device may be used as the type of the filter.

According to an embodiment, the processor 270 may configure at least one of the ISO sensitivity of the camera 210 or the exposure value of the camera 210 included in the image capturing information based on the color of the at least one subject included in the information of the at least one subject selected as the capturing target. For example, when the color of the subject is determined to be a bright color, the processor 270 may configure the ISO sensitivity of the camera 210 to be a low value and may configure the exposure value of the camera 210 to be a low value (e.g., −1). For another example, when the color of the subject is determined to be an intermediate color, the processor 270 may configure the ISO sensitivity of the camera 210 to be a default value and may configure the exposure value of the camera 210 to be an intermediate value (e.g., 0). For another example, when the color of the subject is determined to be a dark color, the processor 270 may configure the ISO sensitivity of the camera 210 to be a high value and may configure the exposure value of the camera 210 to be a high value (e.g., 1).

According to an embodiment, the processor 270 may configure the type of the filter of the camera 210 included in the image capturing information based on the type of the filter applied (or preferred) when the at least one subject included in the information of the at least one subject selected as the capturing target is captured. For example, the processor 270 may configure the type of the filter of the camera 210 to be the type of the filter included in the information of the subject.

According to an embodiment, the processor 270 may change the image capturing information of the camera 210 based on movement information of the external electronic device related to the at least one subject selected as the capturing target. For example, when it is determined that the subject related to the external electronic device is moving based on the movement of the external electronic device, the processor 270 may change the image capturing information to optimal image capturing information for capturing the moving subject.

According to an embodiment, the processor 270 may change the angle of view included in the image capturing information based on a movement direction and a movement speed included in the movement information of the external electronic device. For example, when the movement speed is greater than or equal to a designated value, the processor 270 may change the angle of view of the camera 210 to a wide angle. For another example, when the movement speed is less than the designated value, the processor 270 may change the angle of view of the camera 210 to a narrow angle (telephoto angle). For another example, when it is determined that the moving subject may be deviated from a current angle of view based on the movement direction, the processor 270 may change the angle of view of the camera 210 to a wide angle.

In the above description, changing the angle of view of the camera 210 to the wide angle may mean changing the angle of view of the camera 210 to a greater angle of view than the current angle of view. For example, when the current angle of view is a first angle of view, the processor 240 may change the angle of view of the camera 210 to a second angle of view greater than the first angle of view. In addition, in the above description, changing the angle of view of the camera 210 to the narrow angle (telephoto angle) may mean changing the angle of view of the camera 210 to a smaller angle of view than the current angle of view. For example, when the current angle of view is the first view angle, the processor 240 may change the angle of view of the camera 210 to a third angle of view smaller than the first angle of view.

According to an embodiment, the processor 270 may variably perform the change in the angle of view according to a change in the location of the external electronic device depending on the size of the subject and the separation distance between the electronic device 200 and the external electronic device. For example, the processor 270 may change the angle of view of the camera 210 to an angle of view obtained by following Equation 1.

$$V=2*180*\pi*\tan^{-1}(l/(2*d))$$ Equation 1

Here, V denotes an angle of view, l denotes a diagonal length of the subject, and d denotes a distance from the camera to the subject, that is, a separation distance between the electronic device 200 and the external electronic device.

According to an embodiment, the processor 270 may change at least one of the shutter speed, the ISO sensitivity, or the aperture value included in the image capturing information based on the movement direction and the movement speed included in the movement information of the external electronic device. For example, when the movement speed is greater than or equal to a designated value, the processor 270 may change the shutter speed of the camera 210 to a low value (e.g., 1/1000 or less), may change the ISO sensitivity of the camera 210 to a high value, and may change the aperture value of the camera 210 to a default value (e.g., F2.4). For another example, when the movement speed is less than the designated value, the processor 270 may change the shutter speed of the camera 210 to a high value (e.g., 1/200 or less), may change the ISO sensitivity of the camera 210 to a default value or a low value, and may change the aperture value of the camera 210 to a low value (e.g., F1.5).

The display 290 may display various contents (e.g., text, image, video, icon or symbol) to the user. For example, the display 290 may display an image captured through the camera 210. According to an embodiment, the display 290 may include a touch screen, and may receive a touch, gesture, proximity, or hovering input using, for example, an electronic pen or a user's body portion.

As described above, according to various embodiments, an electronic device (e.g., the electronic device 200 of FIG. 2) may include a communication circuit (e.g., the communication circuit 230 of FIG. 2), a memory (e.g., the memory 250 of FIG. 2), at least one camera (e.g., the camera 210 of FIG. 2), and a processor (e.g., the processor 270 of FIG. 2) configured to be operatively connected to the communication circuit, the memory, and the at least one camera, wherein the processor may be configured to acquire information related to a location of at least one external electronic device based on a signal received from the at least one external electronic device through the communication circuit, receive information of a subject related to the at least one external electronic device from the at least one external electronic device through the communication circuit, and configure image capturing information of the at least one camera based on the information related to the location of the external electronic device and the information of the subject.

According to various embodiments, the processor may be configured to configure an angle of view included in the image capturing information based on the information related to the location of the external electronic device and a size of the subject included in the information of the subject.

According to various embodiments, the at least one camera may include a plurality of cameras having different angles of view, and the processor may be configured to select an angle of view for capturing the subject based on the information related to the location of the external electronic device and the size of the subject included in the information of the subject, and select a camera corresponding to the selected angle of view among the plurality of cameras as a camera for capturing the subject.

According to various embodiments, the processor may be configured to receive movement information according to a change in the location of the at least one external electronic device from the at least one external electronic device through the communication circuit, and change the image capturing information of the at least one camera based on the movement information of the external electronic device.

According to various embodiments, the processor may be configured to acquire the movement information according to the change in the location of the at least one external electronic device based on another signal received from the at least one external electronic device through the communication circuit, and change the image capturing information of the at least one camera based on the movement information of the external electronic device.

According to various embodiments, the electronic device may further include a display (e.g., the display 290 of FIG. 2), and the processor may be configured to display a display object corresponding to the at least one external electronic device connected through the communication circuit on the display in response to the reception of the signal.

According to various embodiments, the processor may be configured to select a subject related to the external electronic device corresponding to the selected display object as a capturing target in response to the selection of the display object.

According to various embodiments, the electronic device may further include a display (e.g., the display 290 of FIG. 2), and the processor may be configured to display the display object corresponding to each of the plurality of external electronic device on the display when connected to the plurality of external electronic devices through the communication circuit, and select the subject related to the at least one external electronic device corresponding to the selected at least one display object as the capturing target when at least one display object is selected among the display objects.

According to various embodiments, the processor may be configured to acquire a size of a capturing area for capturing the capturing target based on information related to a location of each of the plurality of external electronic devices corresponding to a plurality of display objects and a size of each of the subjects related to the plurality of external electronic devices when the selected at least one display object includes the plurality of display objects, and configure the angle of view included in the image capturing information based on the size of the capturing area.

According to various embodiments, the communication circuit may be configured to support at least one communication of UWB communication, Wi-Fi communication, WiGig communication, BT communication, or BLE communication.

Figure 3:
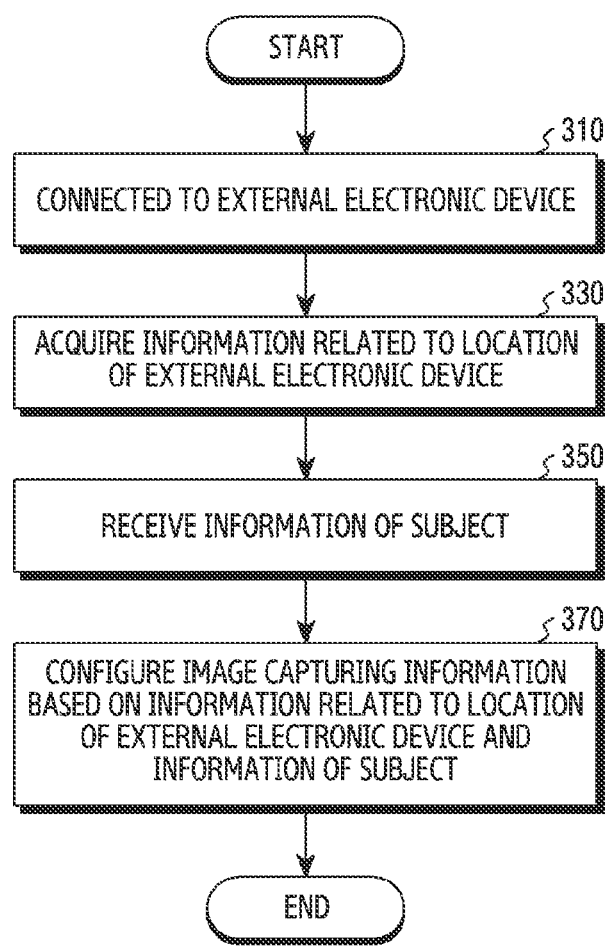
FIG. 3 is a diagram illustrating an image capturing method using wireless communication according to an embodiment of the disclosure.

FIG. 3 is a diagram illustrating an image capturing method using wireless communication according to an embodiment of the disclosure.

Referring to FIG. 3, in operation 310, a processor (e.g., the processor 270 of FIG. 2) of an electronic device (e.g., the electronic device 200 of FIG. 2) may be connected to at least one external electronic device through a communication circuit (e.g., the communication circuit 230 of FIG. 2) of the electronic device. Wireless communication supported by the communication circuit may include, for example, at least one of UWB communication, Wi-Fi communication, WiGig communication, BT communication, or BLE communication.

According to an embodiment, the processor may display a display object corresponding to the at least one external electronic device connected through the communication circuit on a display (e.g., the display 290 of FIG. 2) of the electronic device. The display object may include, for example, at least one of text, image, or icon for identifying the at least one external electronic device. For example, the display object may include an identifier (e.g., name) or image (e.g., face image) of a subject related to the at least one external electronic device. According to an embodiment, when there are a plurality of external electronic devices connected through the communication circuit, the processor may display the display object corresponding to each of the plurality of external electronic devices on the display.

In operation 330, when the at least one external electronic device is connected, the processor may acquire information related to a location of the at least one external electronic device based on a signal received from the at least one external electronic device through the communication circuit. Here, the at least one external electronic device may be an electronic device related to a subject selected as a capturing target. According to an embodiment, when the communication circuit supports UWB communication, the processor may measure the location of the at least one external electronic device through a ranging operation using UWB communication.

In operation 350, the processor may receive information of the subject related to the at least one external electronic device from the at least one external electronic device through the communication circuit. The information of the subject may include profile information of the subject. The profile information of the subject may include at least one of, a type of the subject (e.g., human {adult or child}), animal, or object), an identifier (e.g., name or phone number) of the subject, a size (e.g., a horizontal length {shoulder wide}, vertical length {height}, or diagonal length) of the subject, a color (e.g., skin tone) of the subject, or a type of a filter applied (or preferred) when the subject is captured. According to an embodiment, the information of the subject may further include activity information of the subject. The activity information of the subject may be a type of motion performed by the subject sensed by a device attached to the subject, a movement speed of the subject (or the device), a movement direction of the subject (or the device), or a location of the subject (or the device).

When the information related to the location of the at least one external electronic device is received and the information of the subject related to the at least one external electronic device is received, in operation 370, the processor may configure image capturing information of at least one camera (e.g., the camera 210 of FIG. 2) included in the electronic device based on the information related to the at least one external electronic device and the information of the subject. The image capturing information may include at least one of, for example, an angle of view of the camera, a shutter speed of the camera, ISO sensitivity of the camera, an exposure value of the camera, an aperture value of the camera, or a type of a filter of the camera.

According to an embodiment, the processor may configure the angle of view of the camera based on the information related to the location of the at least one external electronic device and the size of the subject included in the information of the subject. For example, the processor may configure the angle of view of the camera to be a large angle of view as a separation distance between the electronic device and the external electronic device determined based on the information related to the location of the external electronic device is smaller and the size of the subject is larger. The angle of view may be configured by Equation 1 described above. According to an embodiment, when the electronic device includes a plurality of cameras (e.g., the camera 210 of FIG. 2) having different angles of view, the processor may select an angle of view for capturing the subject based on the information related to the location of the at least one external electronic device and the size of the subject included in the information of the subject, and may select a camera corresponding to the selected angle of view among the plurality of cameras as a camera for capturing the subject.

According to an embodiment, the processor may configure at least one of the aperture value of the camera or the type of the filter of the camera included in the image capturing information based on the type of the subject included in the information of the subject. According to an embodiment, the processor may configure at least one of the ISO sensitivity of the camera or the exposure value of the camera included in the image capturing information based on the color of the subject included in the information of the subject.

According to an embodiment, when it is determined that the subject related to the at least one external electronic device is moving based on the movement of the at least one external electronic device after the image capturing information of the camera is configured, the processor may change the image capturing information of the at least one camera based on the movement information of the external electronic device. For example, the processor may change the angle of view included in the image capturing information based on the movement direction and the movement speed included in the movement information of the external electronic device. For another example, the processor may change at least one of the shutter speed, the ISO sensitivity, or the aperture value which is included in the image capturing information based on the movement direction and the movement speed included in the movement information of the external electronic device.

Figure 4:
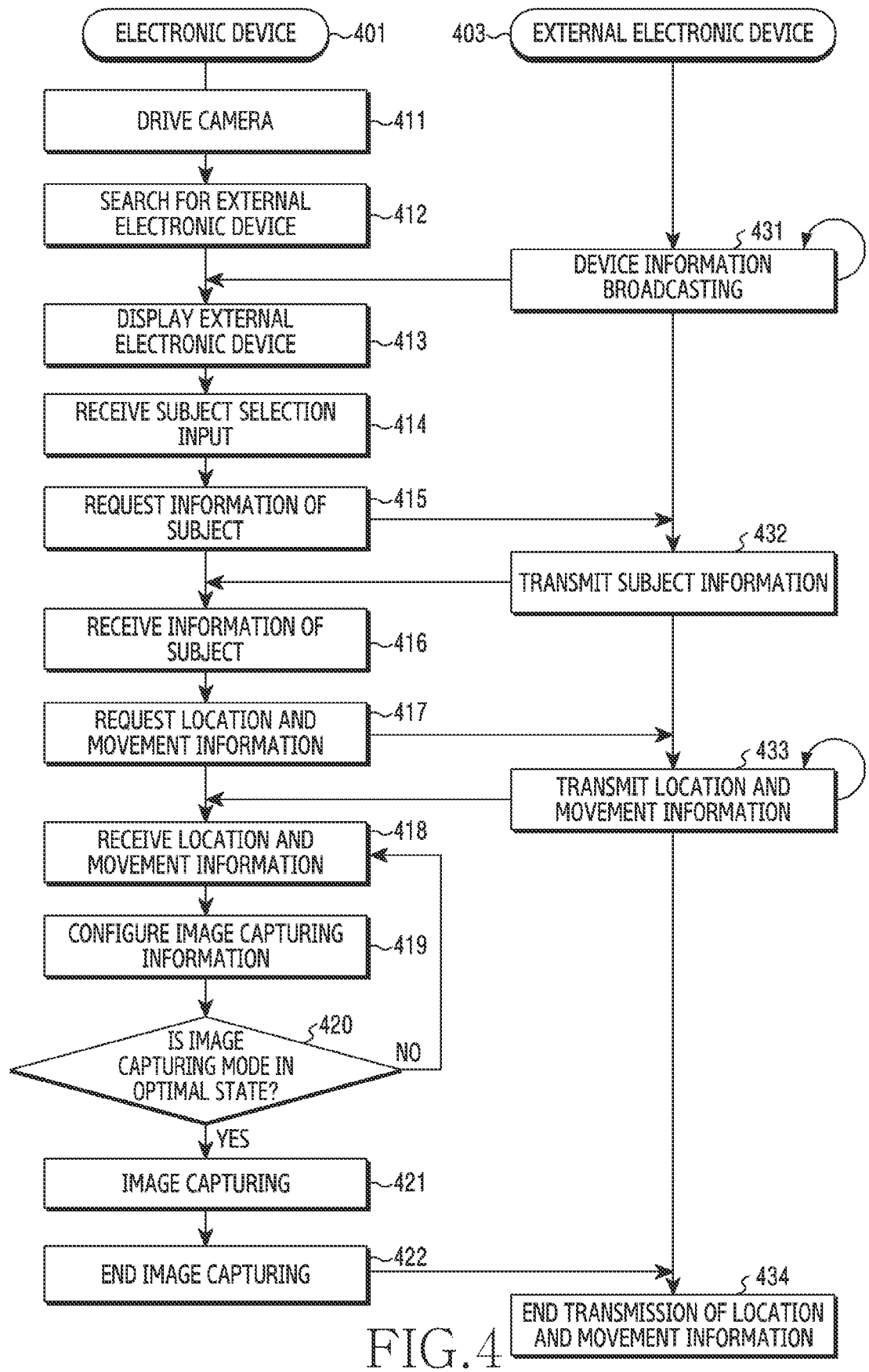
FIG. 4 is a diagram illustrating an image capturing method through signal transmission and reception between an electronic device and an external electronic device according to an embodiment of the disclosure.

FIG. 4 is a diagram illustrating an image capturing method through signal transmission and reception between an electronic device and an external electronic device according to an embodiment of the disclosure.

Referring to FIG. 4, in operation 411, a processor (e.g., the processor 270 of FIG. 2) of an electronic device 401 (e.g., the electronic device 200 of FIG. 2) may drive at least one camera (e.g., the camera 210 of FIG. 2) included in the electronic device 401.

In operation 412, the processor may search for at least one external electronic device 403 through a communication circuit (e.g., the communication circuit 230 of FIG. 2) of the electronic device 401. According to an embodiment, the processor may search for the at least one external electronic device 403 through whether a signal transmitted by the at least one external electronic device 403 is received through a wireless communication protocol supported by the communication circuit. The wireless communication protocol supported by the communication circuit may include at least one of, for example, a UWB communication protocol, a Wi-Fi communication protocol, a WiGig communication protocol, a BT communication protocol, or a BLE communication protocol.

In this regard, the at least one external electronic device 403 may broadcast a signal including device information of the at least one external electronic device 403 at a designated time period, in operation 431. The processor may search for the at least one external electronic device 403 by receiving the signal broadcasted by the at least one external electronic device 403.

When the at least one external electronic device 403 is searched for, in operation 413, the processor may display the searched at least one external electronic device 403. According to an embodiment, the processor may display a display object corresponding to the searched at least one external electronic device 403 on a display (e.g., the display 290 of FIG. 2) of the electronic device 401. The display object may include, for example, at least one of text, image, or icon for identifying the at least one external electronic device 403. For example, the display object may include an identifier (e.g., name) or image (e.g., face image) of a subject related to the at least one external electronic device 403. Here, the fact that the external electronic device 403 is related to the subject may mean a state in which the external electronic device 403 is attached to or worn on the subject.

In operation 414, the processor may receive an input for selecting a subject. According to an embodiment, the processor may receive a user input (e.g., a touch input) for selecting a display object displayed on the display. When the display object is selected, the processor may select a subject related to the external electronic device 403 corresponding to the selected display object as a capturing target.

When the subject is selected, in operation 415, the processor may request information of the subject from the external electronic device 403 related to the selected subject. For example, the processor may transmit a signal requesting the information of the subject to the external electronic device 403 through the communication circuit.

The external electronic device 403 having received a request for the information of the subject (having received a signal requesting the information of the subject) may transmit the information of the subject stored in the external electronic device 403 to the electronic device 401, in operation 432. The information of the subject may include profile information of the subject. The profile information of the subject may include at least one of, for example, a type of the subject (e.g., human {adult or child}, animal, or object), an identifier (e.g., name or phone number) of the subject, a size (e.g., a horizontal length {shoulder wide}, vertical length {height}, or diagonal length) of the subject, a color (e.g., skin tone) of the subject, or a type of a filter applied (or preferred) when the subject is captured.

In operation 416, the processor may receive the information of the subject from the external electronic device 403 through the communication circuit.

In operation 417, the processor may request a location of the external electronic device 403 and movement information of the external electronic device 403 from the external electronic device 403. For example, the processor may transmit a signal requesting the location of the external electronic device 403 and the movement information of the external electronic device to the external electronic device 403 through the communication circuit. The movement information may include, for example, a type of a motion sensed by the external electronic device 403 and information on the movement direction and movement speed of the external electronic device 403.

According to an embodiment, in operation 417, the processor may determine the location of the external electronic device 403 based on the signal received from the external electronic device 403 through the communication circuit instead of requesting the location of the external electronic device 403. In addition, in operation 417, the processor may determine (or track) the movement of the external electronic device 403 based on the signal received from the external electronic device 403 at a designated time period through the communication circuit instead of requesting the movement information of the external electronic device 403, thereby acquiring the movement information of the external electronic device 403.

The external electronic device 403 having received a request for the location of the external electronic device 403 and the movement information of the external electronic device 403 (having received a signal requesting the location of the external electronic device 403 and the movement information of the external electronic device 403) may transmit the location of the external electronic device 403 and the movement information of the external electronic device 403 to the electronic device 401 at a designated time period, in operation 433. In this regard, the external electronic device 403 may include a sensor (e.g., an acceleration sensor or a GPS sensor) capable of detecting the location and movement of the external electronic device 403, and may transmit the location and movement information of the external electronic device 403 measured through the sensor to the electronic device 200.

In operation 418, the processor may receive the location of the external electronic device 403 and the movement information of the external electronic device 403 from the external electronic device 403 through the communication circuit. According to an embodiment, when the processor determines (or tracks) the location of the external electronic device 403 and the movement of the external electronic device 403 based on the signal received from the external electronic device 403 through the communication circuit instead of requesting the location of the external electronic device 403 and the movement information of the external electronic device 403 in operation 417, operation 418 may be omitted.

In operation 419, the processor may configure image capturing information of the at least one camera based on the location of the external electronic device 403 related to the subject selected as the capturing target, the movement information of the external electronic device 403, and the information of the subject. The image capturing information may include at least one of, for example, an angle of view of the at least one camera, a shutter speed of the at least one camera, ISO sensitivity of the at least one camera, an exposure value of the at least one camera, an aperture value of the at least one camera, or a type of a filter of the at least one camera.

According to an embodiment, the processor may configure the angle of view of the at least one camera based on the location of the external electronic device 403, the movement direction and movement speed included in the movement information of the external electronic device 403, and the size of the subject included in the information of the subject. The angle of view may be configured by Equation 1 described above. According to another embodiment, when the electronic device 401 includes a plurality of cameras (e.g., the camera 210 of FIG. 2) having different angles of view, the processor may select an angle of view for capturing the subject based on the location of the external electronic device 403, the movement direction and movement speed included in the movement information of the external electronic device 403, and the size of the subject included in the information of the subject, and may select the camera corresponding to the selected angle of view among the plurality of cameras as a camera for capturing the subject.

According to an embodiment, the processor may configure at least one of the aperture value of the camera or the type of the filter of the camera included in the image capturing information based on the type of the subject included in the information of the subject. According to an embodiment, the processor may configure at least one of the ISO sensitivity of the camera or the exposure value of the camera included in the image capturing information based on the color of the subject included in the information of the subject. According to an embodiment, the processor may configure at least one of the shutter speed, the ISO sensitivity, or the aperture value included in the image capturing information based on the movement direction and movement speed included in the movement information of the external electronic device 403.

When the image capturing information of the at least one camera is configured, in operation 420, the processor may determine whether an image capturing mode for capturing the subject is in an optimal state according to the configured image capturing information. When the subject selected as the capturing target is moving after the image capturing information of the at least one camera is configured, the subject may be deviated from the angle of view of the at least one camera or the quality of an image obtained by capturing the subject may be degraded.

According to an embodiment, when it is determined that the subject is deviated from a currently configured angle of view of the camera, based on the location of the external electronic device 403, the movement direction and movement speed of the movement information of the external electronic device 403, and the size of the subject included in the information of the subject, the processor may determine that an image capturing mode is not an optical state. According to another embodiment, when the processor analyzes a preview image obtained by capturing the subject at the currently configured angle of view of the camera and at least a partial area of an object corresponding to the subject is not included in the preview image (when the entire area of the object corresponding to the subject is not included in the preview image), the processor may determine that the image capturing mode is not in the optimal state.

When it is determined that the image capturing mode is not in the optimal state, the processor may return to operation 418. For example, the processor may re-receive the location of the external electronic device 403 and the movement information of the external electronic device 403 from the external electronic device 403 through the communication circuit. Alternatively, the processor may re-determine (or track) the location of the external electronic device 403 and the movement of the external electronic device 403 based on the signal received from the external electronic device 403 through the communication circuit instead of requesting the location of the external electronic device 403 and the movement information of the external electronic device 403.

Next, in operation 419, the processor may re-configure (or change) the image capturing information of the at least one camera based on the re-received (or re-determined) location of the external electronic device 403, the re-receive (or re-determined) movement information of the external electronic device 403, and the information of the subject.

After re-configuring (or changing) the image capturing information of the at least one camera, in operation 420, the processor may re-determine whether the image capturing mode for capturing the subject is in the optimal state according to the configured image capturing information. When it is determined that the image capturing mode is not in the optimal state, the processor may return to operation 418. For example, the processor may repeatedly perform operation 418 to operation 420 until the image capturing mode becomes in the optimal state.

When it is determined that the image capturing mode is in the optimal state, in operation 421, the processor may capture an image of the subject selected as the capturing target using the at least one camera. The captured image may include at least one of a still image and a moving image. According to an embodiment, when capturing a video of the subject, the processor may repeatedly perform operations 418 to 421 until the capturing ends.

When receiving an input for ending the capturing of the image, the processor may end the capturing of the image, in operation 422. For example, the input for ending the capturing of the image may correspond to an operation of acquiring a still image when the image to be captured is the still image, and may correspond to an operation in which a capturing end button (or object) is selected when the image to be captured is a video.

When the capturing of the image ends, the processor may transmit a signal indicating the end of capturing to the external electronic device 403 related to the subject to be captured. In operation 434, the external electronic device 403 that has received the signal indicating the end of capturing may end the operation of transmitting the location of the external electronic device 403 and the movement information of the external electronic device 403.

As described above, according to various embodiments, an image capturing method using wireless communication of an electronic device (e.g., the electronic device 200 of FIG. 2) may include acquiring (e.g., operation 330 of FIG. 3) information related to a location of at least one external electronic device based on a signal received from the at least one external electronic device through a communication circuit (e.g., the communication circuit 230 of FIG. 2) of the electronic device, receiving (e.g., operation 350 of FIG. 3) information of a subject related to the at least one external electronic device from the at least one external electronic device through the communication circuit, and configuring (e.g., operation 370 of FIG. 3) image capturing information of at least one camera (e.g., the camera 210 of FIG. 2) included in the electronic device based on information related to the location of the external electronic device and information of the subject.

According to various embodiments, the configuring of the image capturing information may include configuring an angle of view included in the image capturing information based on the information related to the location of the external electronic device and a size of the subject included in the information of the subject.

According to various embodiments, the at least one camera may include a plurality of cameras having different angles of view, and the configuring of the image capturing information may include selecting an angle of view for capturing the subject based on the information related to the location of the external electronic device and a size of the subject included in the information of the subject, and selecting a camera corresponding to the selected angle of view among the plurality of cameras as a camera for capturing the subject.

According to various embodiments, the image capturing method may further include receiving movement information according to a change in the location of the at least one external electronic device from the at least one external electronic device through the communication circuit, and changing the image capturing information of the at least one camera based on the movement information of the external electronic device.

According to various embodiments, the image capturing method may further include acquiring the movement information according to the change in the location of the at least one external electronic device based on another signal received from the at least one external electronic device through the communication circuit, and changing image capturing information of the at least one camera based on the movement information of the external electronic device.

According to various embodiments, the image capturing method may further include displaying a display object corresponding to the at least one external electronic device connected through the communication circuit on a display (e.g., the display 290 of FIG. 2) of the electronic device in response to the reception of the signal.

According to various embodiments, the image capturing method may further include selecting a subject related to the external electronic device corresponding to the selected display object as a capturing target in response to the selection of the display object.

According to various embodiments, the image capturing method may further include displaying display objects corresponding to the plurality of external electronic devices on the display (e.g., the display 290 of FIG. 2) of the electronic device when the electronic device is connected to the plurality of external electronic devices through the communication circuit, and selecting the subject related to the at least one external electronic device corresponding to the selected at least one display object as the capturing target when at least one display object is selected among the display objects.

According to various embodiments, the configuring of the image capturing information may include acquiring a size of a capturing area for capturing the capturing target based on information related to the location of each of the plurality of external electronic devices corresponding to the plurality of display objects and the sizes of the subjects related to the plurality of external electronic devices when the selected at least one display object includes the plurality of display objects, and configuring the angle of view included in the image capturing information based on the size of the capturing area.

According to various embodiments, the communication circuit may be configured to support at least one of UWB communication, Wi-Fi communication, WiGig communication, BT communication, or BLE communication.

Figure 5:
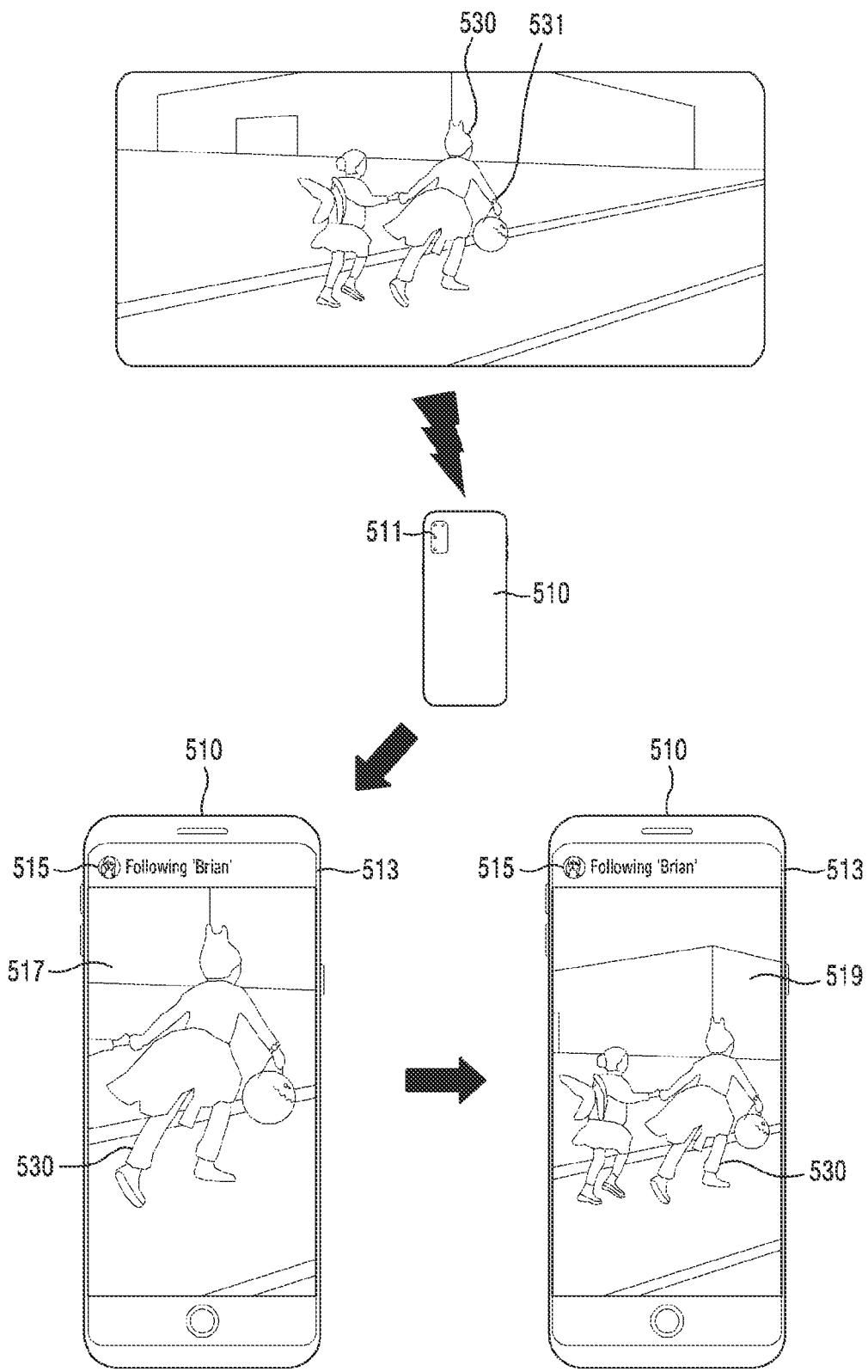
FIG. 5 is a diagram illustrating an image capturing method through wireless communication with an external electronic device related to a subject according to an embodiment of the disclosure.

FIG. 5 is a diagram illustrating an image capturing method through wireless communication with an external electronic device related to a subject according to an embodiment of the disclosure.

Referring to FIG. 5, an electronic device 510 (e.g., the electronic device 200 of FIG. 2) may capture a subject 530 using a camera 511 (e.g., the camera 210 of FIG. 2). The electronic device 510 may configure image capturing information of the camera 511 for capturing the subject 530 based on a signal received from an external electronic device 531 attached to or worn on the subject 530 through a communication circuit (e.g., the communication circuit 230 of FIG. 2) included in the electronic device 510. According to an embodiment, the external electronic device 531 may refer to a wearable electronic device (e.g., a smart watch) that can be attached to or worn on the subject 530, or a tag device attached to the subject 530. In FIG. 5, a state in which the smart watch (e.g., the external electronic device 531) is worn on the subject 530 is illustrated.

According to an embodiment, the electronic device 510 may display a display object 515 corresponding to the external electronic device 531 connected through the communication circuit, on a display 513 (e.g., the display 290 of FIG. 2) of the electronic device 510. The display object 515 may include, for example, at least one of text, image or icon for identifying the external electronic device 531. In FIG. 5, a state in which the display object 515 is displayed as an image (e.g., face image) of the subject 530 is illustrated.

According to an embodiment, the electronic device 510 may acquire information related to the location of the external electronic device 531 based on a signal received from the external electronic device 531 through the communication circuit. In addition, the electronic device 510 may receive information of the subject 530 from the external electronic device 531 through the communication circuit.

When the information related to the location of the external electronic device 531 is acquired and the information of the subject 530 is received, the electronic device 510 may configure the image capturing information of the camera 511 based on the location of the external electronic device 531 and the information of the subject 530. According to an embodiment, the electronic device 510 may configure an angle of view of the camera 511 based on the location of the external electronic device 531 and the size of the subject 530 included in the information of the subject 530. In addition, the electronic device 510 may display a first preview image 517 of the subject 530 captured at the configured angle of view on the display 513.

After the image capturing information of the camera 511 is configured, when it is determined that the subject 530 is moving based on the movement of the external electronic device 531, the electronic device 510 may change the image capturing information of the camera 511 based on the movement information of the external electronic device 531. According to an embodiment, the electronic device 510 may change the angle of view of the camera 511 based on the movement direction and movement speed included in the movement information of the external electronic device 531. In addition, the electronic device 510 may display a second preview image 519 of the subject 530 captured at the changed angle of view on the display 513. For example, the electronic device 510 may change the first preview image 517 displayed on the display 513 to the second preview image 519.

Figure 6:
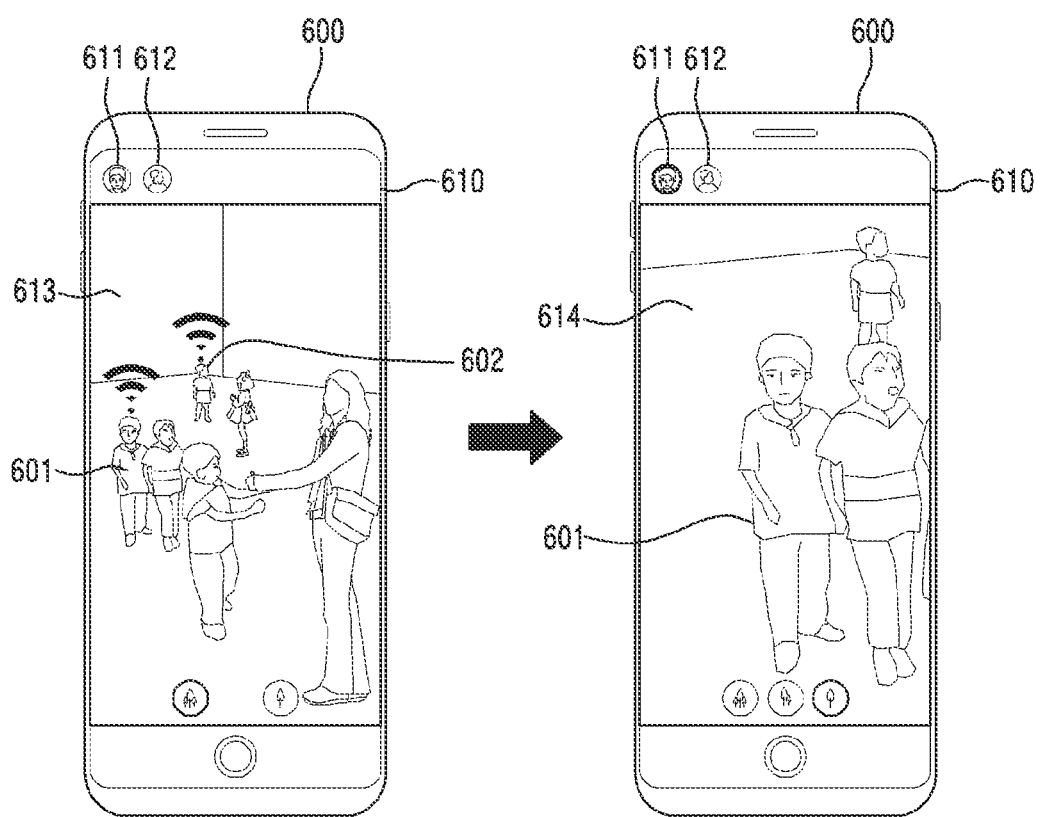
FIG. 6 is a diagram illustrating a method of identifying the location of a subject through wireless communication according to an embodiment of the disclosure.

FIG. 6 is a diagram illustrating a method of identifying a location of a subject through wireless communication according to an embodiment of the disclosure.

Referring to FIG. 6, an electronic device 600 (e.g., the electronic device 200 of FIG. 2) may determine a location of at least one external electronic device based on a signal received from the at least one external electronic device attached to or worn on at least one subject (e.g., a first subject 601 or a second subject 602) through a communication circuit (e.g., the communication circuit 230 of FIG. 2) included in the electronic device 600, and may identify a location of the at least one subject based on the location of the at least one external electronic device.

According to an embodiment, when the communication circuit supports UWB communication, the electronic device 600 may measure the location of the at least one external electronic device through a ranging operation using UWB communication. For example, the electronic device 600 may acquire (or calculate) the location of the at least one external electronic device by using an angle of arrival (AoA) of a signal received from the at least one external electronic device. According to an embodiment, the AoA of the signal may be acquired (or calculated) using a distance between antennas receiving the signal and a phase difference (PDoA) of a signal received by each of the antennas. In FIG. 6, the locations of the external electronic devices related to a plurality of subjects (e.g., the first subject 601 or the second subject 602) may be acquired (or calculated), and as a result, the locations of the plurality of subjects may be identified.

According to an embodiment, the electronic device 600 may display, on a display 610 (e.g., the display 290 of FIG. 2), display objects corresponding to the identified plurality of subjects. FIG. 6 shows a state in which a first display object 611 corresponding to the identified first subject 601 and a second display object 612 corresponding to the identified second subject 602 are displayed on the display 610. According to an embodiment, the electronic device 600 may display a captured first preview image 613 on the display 610 so that all of the identified plurality of subjects may be included.

According to an embodiment, when at least one display object is selected among the plurality of display objects displayed on the display 610, the electronic device 600 may select at least one subject corresponding to the selected at least one display object as a capturing target. FIG. 6 shows a state in which the first display object 611 is selected from the first display object 611 and the second display object 612 displayed on the display 610 and the first subject 601 corresponding to the first display object 611 is selected as a capturing target.

According to an embodiment, the electronic device 600 may apply a visual effect to the selected at least one display object. The visual effect is, for example, to distinguish the selected display object from non-selected display objects, and may include a change in color, shape, or thickness of a border of the selected display object, a change in color or shape of the selected display object, or applying an animation effect to the selected display object. FIG. 6 shows a state in which the border of the selected first display object 611 is thicker than the border of the non-selected second display object 612.

According to an embodiment, when at least one subject to be captured is selected, the electronic device 600 may configure image capturing information of at least one camera (e.g., the camera 210 of FIG. 2) included in the electronic device 600 as optimal image capturing information for capturing the at least one subject. For example, when the at least one selected subject is captured, the electronic device 600 may configure an angle of view of the at least one camera such that an object corresponding to the at least one subject is located in a central region of a captured image. FIG. 6 shows a state in which the electronic device 600 configures the angle of view so that the first subject 601 selected as the capturing target is located in the central region, and displays a second preview image 614 captured at the configured angle of view on the display 610.

Figure 7:
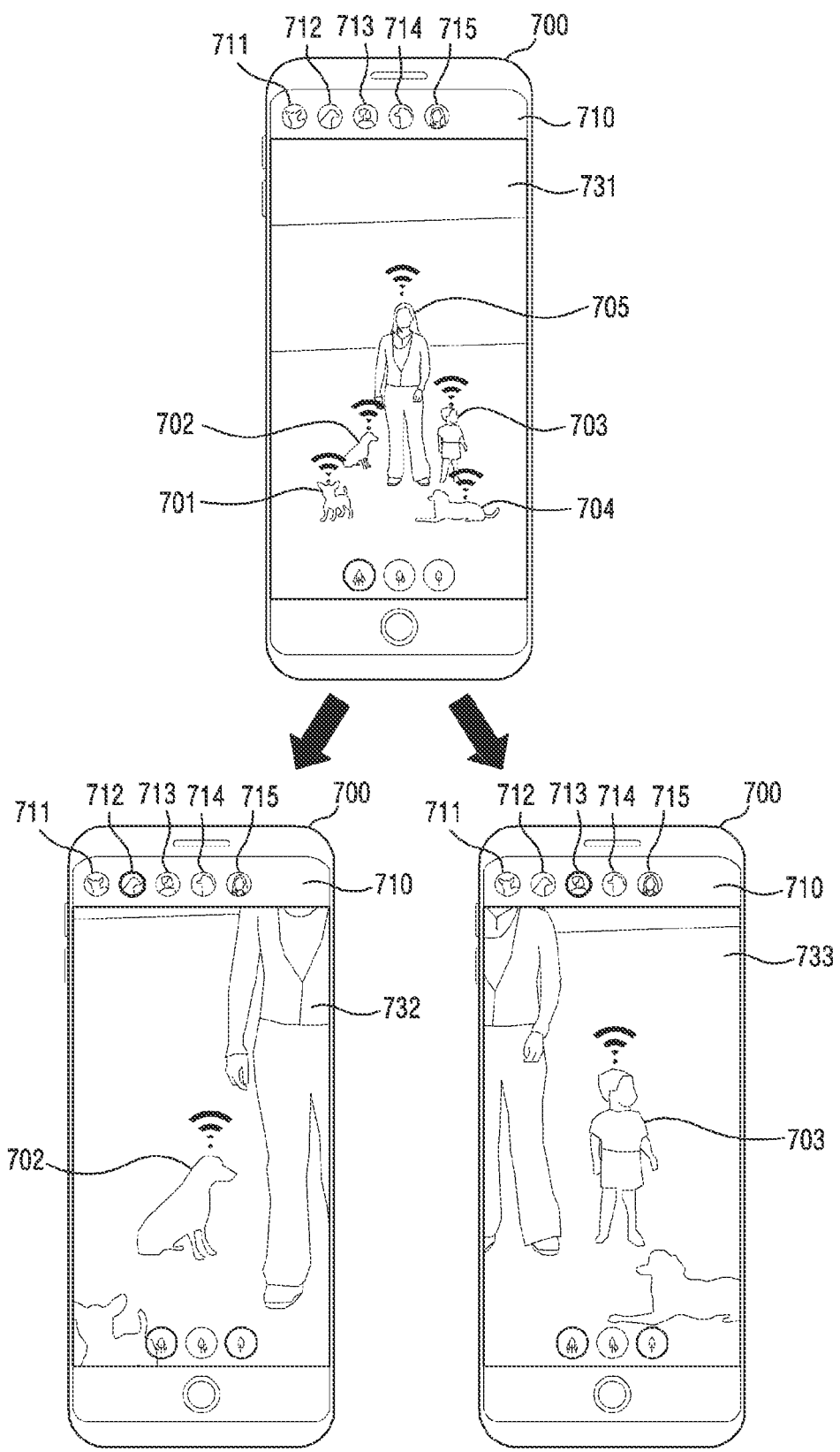
FIG. 7 is a diagram illustrating a method of selecting a subject identified through wireless communication according to an embodiment of the disclosure.

FIG. 7 is a diagram illustrating a method of selecting a subject identified through wireless communication according to an embodiment of the disclosure.

Referring to FIG. 7, an electronic device 700 (e.g., the electronic device 200 of FIG. 2) may determine locations of external electronic devices based on signals received from the external electronic devices attached to or worn on a plurality of subjects (e.g., a first subject 701, a second subject 702, a third subject 703, a fourth subject 704, or a fifth subject 705) through a communication circuit (e.g., the communication circuit 230 of FIG. 2) included in the electronic device 700, and may identify locations of the subjects based on the locations of the external electronic devices. In addition, the electronic device 700 may display, on a display 710 (e.g., the display 290 of FIG. 2), display objects corresponding to the identified plurality of subjects. FIG. 7 shows a state in which a first display object 711 corresponding to an identified first subject 701, a second display object 712 corresponding to an identified second subject 702, a third display object 713 corresponding to an identified third subject 703, a fourth display object 714 corresponding to an identified fourth subject 704, and a fifth display object 715 corresponding to an identified fifth subject 705 are displayed on the display 710. According to an embodiment, the electronic device 700 may display a captured first preview image 731 on the display 710 so that all of the identified plurality of subjects may be included.

According to an embodiment, when one of the plurality of display objects displayed on the display 710 is selected, the electronic device 700 may select a subject corresponding to the selected display object as a capturing target. In addition, the electronic device 700 may configure image capturing information of at least one camera (e.g., the camera 210 of FIG. 2) included in the electronic device 700 as optimal capturing information for capturing the subject corresponding to the selected display object.

For example, the electronic device 700 may select the second subject 702 corresponding to the selected second display object 712 as the capturing target when the second display object 712 displayed on the display 710 is selected, and may configure an angle of view of the at least one camera so that an object corresponding to the second subject 702 is located in a central region of a captured image when the selected second subject 702 is captured. In addition, the electronic device 700 may display a second preview image 732 captured at the configured angle of view on the display 710.

For another example, the electronic device 700 may select the third subject 703 corresponding to the selected third display object 713 as the capturing target when the third display object 713 displayed on the display 710 is selected, and may configure the angle of view of the at least one camera so that an object corresponding to the third subject 703 is located in a central region of a captured image when the selected third subject 703 is captured. In addition, the electronic device 700 may display a third preview image 733 captured at the configured angle of view on the display 710.

Figure 8:
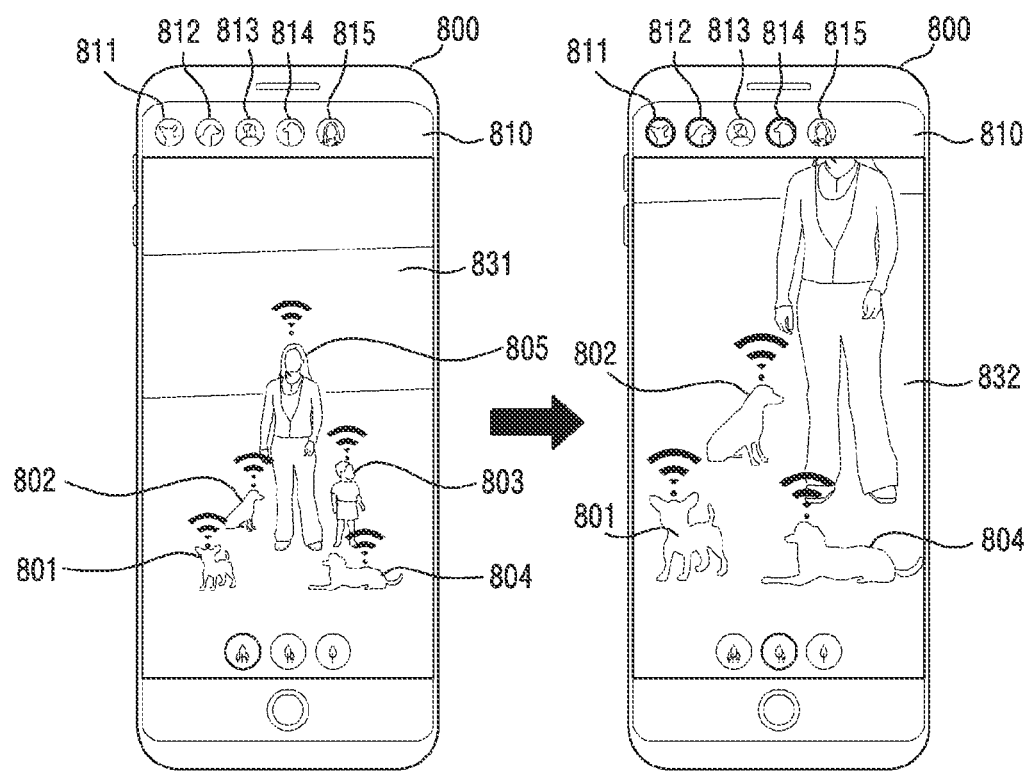
FIG. 8 is a diagram illustrating a method of selecting a plurality of subjects identified through wireless communication according to an embodiment of the disclosure.

FIG. 8 is a diagram illustrating a method of selecting a plurality of subjects identified through wireless communication according to an embodiment of the disclosure.

Referring to FIG. 8, an electronic device 800 (e.g., the electronic device 200 of FIG. 2) may determine locations of external electronic devices based on signals received from the external electronic devices attached to or worn on a plurality of subjects (e.g., a first subject 801, a second subject 802, a third subject 803, a fourth subject 804, or a fifth subject 805) through a communication circuit (e.g., the communication circuit 230 of FIG. 2) included in the electronic device 800, and may identify locations of the subjects based on the locations of the external electronic devices. In addition, the electronic device 800 may display, on a display 810 (e.g., the display 290 of FIG. 2), display objects corresponding to the identified plurality of subjects. FIG. 8 shows a state in which a first display object 811 corresponding to an identified first subject 801, a second display object 812 corresponding to an identified second subject 802, a third display object 813 corresponding to an identified third subject 803, a fourth display object 814 corresponding to an identified fourth subject 804, and a fifth display object 815 corresponding to an identified fifth subject 805 are displayed on the display 810. According to an embodiment, the electronic device 800 may display a captured first preview image 831 on the display 810 so that all of the identified plurality of subjects are included.

According to an embodiment, when at least two or more display objects are selected among the plurality of display objects displayed on the display 810, the electronic device 800 may select subjects corresponding to the selected display objects as the capturing targets. In addition, the electronic device 800 may configure image capturing information of at least one camera (e.g., the camera 210 of FIG. 2) included in the electronic device 800 as optimal capturing information for capturing the subjects corresponding to the selected display objects.

According to an embodiment, the electronic device 800 may acquire (or calculate) a size of a capturing area for capturing the selected subjects based on the locations of the external electronic devices related to the subjects selected as the capturing targets and the sizes of the subjects included in information of each of the subjects, and may configure an angle of view of the at least one camera based on the acquired size of the capturing area. The capturing area may be an area including all of the selected subjects when the selected subjects are viewed from the location of the electronic device 800. A diagonal length of the capturing area may correspond to a diagonal length of each of the subjects. For example, in a case in which the selected subjects are included in the capturing area, when it is assumed that a horizontal direction is an x-axis and a vertical direction is a y-axis, the left end of the capturing area may be configured to be the lowest point of x-axis coordinate value among the selected subjects, the right end of the capturing area may be configured to be the highest point of the x-axis coordinate value of the selected subjects, the upper end of the capturing area may be configured to be the highest point of y-axis coordinate value among the selected subjects, and the lower end of the capturing area may be configured to be the lowest point of the y-axis coordinate value among the selected subjects. According to an embodiment, the capturing area may be configured in consideration of a margin. For example, the left end of the capturing area may be configured to be a value subtracted by a designated value from the lowest point of the x-axis coordinate value among the selected subjects, the right end of the capturing area may be configured to be a value summed by a designated value from the highest point of the x-axis coordinate value among the selected subjects, the upper end of the capturing area may be configured to be a value summed by a designated value from the highest point of the y-axis coordinate value among the selected subjects, and the lower end of the capturing area may be configured to be a value subtracted by a designated value from the lowest point of the y-axis coordinate value among the selected subjects.

FIG. 8 shows a state in which the first display object 811, the second display object 812, and the fourth display object 814 displayed on the display 810 are selected. In this case, the electronic device 800 may select the selected first display object 811, second display object 812, and fourth display object 814 as the capturing targets, may configure the capturing area including all of the selected first display object 811, the second display object 812, and the fourth display object 814, and may configure the angle of view of the at least one camera based on the size of the configured capturing area. In addition, the electronic device 800 may display a second preview image 832 captured at the configured angle of view on the display 810.

Figure 9:
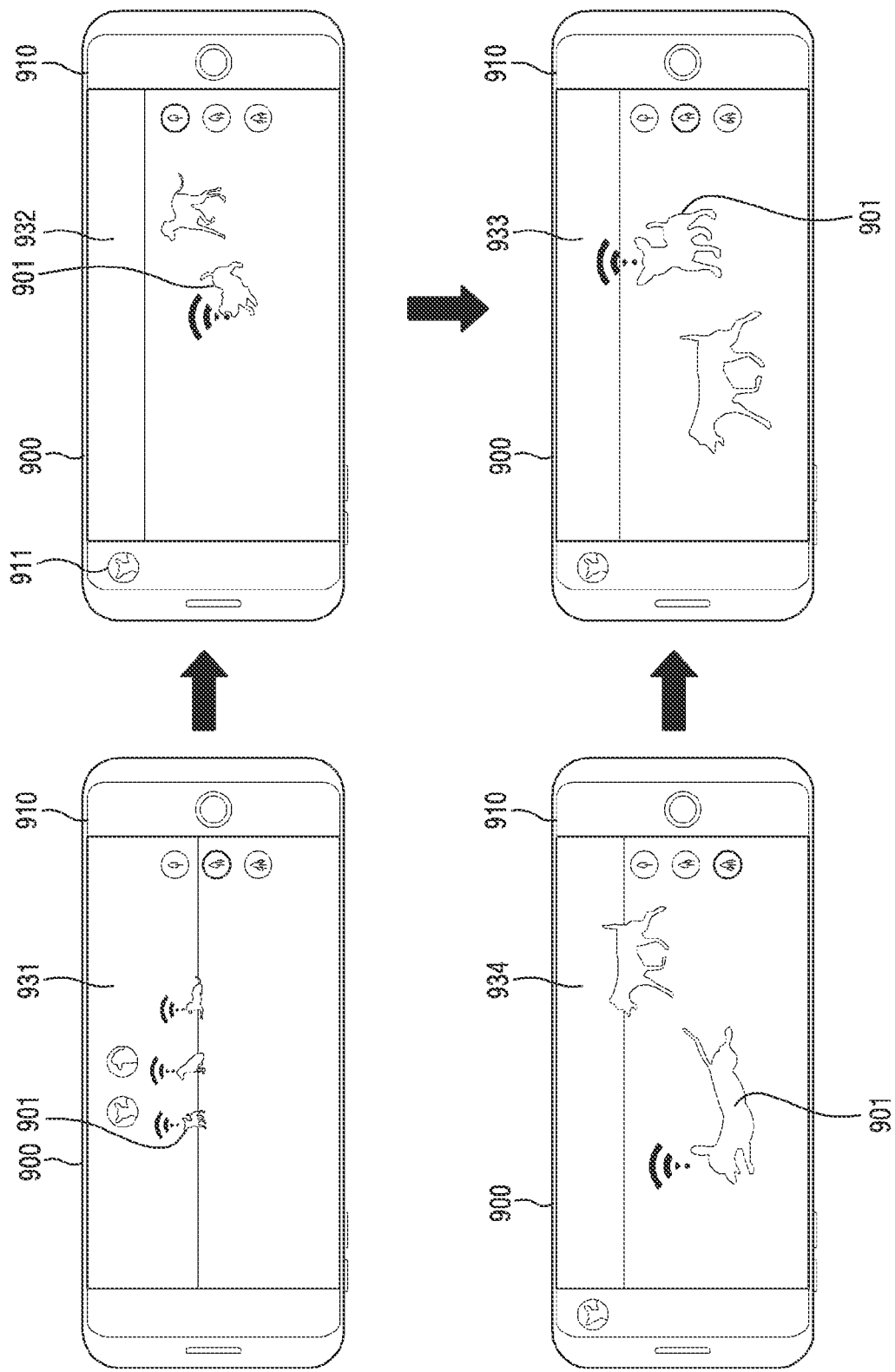
FIG. 9 is a diagram illustrating a method of configuring image capturing information of a camera according to the movement of a subject determined through wireless communication according to an embodiment of the disclosure.

FIG. 9 is a diagram illustrating a method of configuring image capturing information of a camera according to movement of a subject determined through wireless communication according to an embodiment of the disclosure.

Referring to FIG. 9, an electronic device 900 (e.g., the electronic device 200 of FIG. 2) may determine a location of an external electronic device based on a signal received from the external electronic device attached to or worn on at least one subject 901 through a communication circuit (e.g., the communication circuit 230 of FIG. 2) included in the electronic device 900, and may identify a location of the at least one subject 901 based on the location of the external electronic device.

According to an embodiment, in a process of determining the location of the external electronic device related to the at least one subject 901 through the communication circuit (identifying the at least one subject 901), the electronic device 900 may display a first preview image 931 in which an area as wide as possible is captured through at least one camera (e.g., the camera 210 of FIG. 2) included in the electronic device 900, on a display 910. For example, the electronic device 900 may acquire the first preview image 931 by configuring the angle of view of the at least one camera to a wide angle. In the process of identifying the at least one subject 901, the electronic device 900 may display the first preview image 931 in which the area as wide as possible is captured on the display 910, so that the electronic device 900 may support the user to more easily confirm the identified subject 901, and may induce the user to face a direction in which the identified subject 901 is located as a capturing direction of the at least one camera.

According to an embodiment, when the location of the external electronic device related to the at least one subject 901 is determined (the at least one subject 901 is identified), the electronic device 900 may configure image capturing information of the at least one camera based on the location of the external electronic device and information of the subject 901. For example, the electronic device 900 may configure the angle of view of the at least one camera based on the location of the external electronic device and the size of the subject 901 included in the information of the subject 901. In addition, the electronic device 900 may display a second preview image 932 captured at the configured angle of view on the display 910. In addition, the electronic device 900 may display a display object 911 corresponding to the identified subject 901 on the display 910.

When it is determined that the subject 901 is moving based on the movement of the external electronic device, the electronic device 900 may change the image capturing information of the at least one camera based on the movement information of the external electronic device. According to an embodiment, the electronic device 900 may change the angle of view of the at least one camera based on the movement direction and movement speed included in the movement information of the external electronic device. In addition, the electronic device 900 may display a preview image of the subject 901 captured at the changed angle of view on the display 910.

Referring to FIG. 9, in a state in which the angle of view of the at least one camera is configured to be a first angle of view, the electronic device 900 may display the second preview image 932 captured at the first angle of view on the display 910. In addition, the electronic device 900 may change the angle of view of the at least one camera from the first angle of view to a second angle of view based on first movement information (e.g., information of the first subject 601 moving in a first direction and at a first speed) of the external electronic device, and may display a third preview image 933 captured at the second angle of view on the display 910. In addition, the electronic device 900 may change the angle of view of the at least one camera from the second angle of view to a third angle of view based on second movement information (e.g., information on the first subject 601 moving in a second direction and at a second speed) of the external electronic device, and may display a fourth preview image 934 captured at the third angle of view on the display 910.

According to an embodiment, when the at least one camera supports a plurality of angles of view (e.g., first angle of view<second angle of view<third angle of view), the electronic device 900 may change the plurality of angles of view according to sequential operations in a process of changing the angle of view of the at least one camera. For example, the electronic device 900 may change the angle of view to a second angle of view that is one step larger than the first angle of view among the plurality of angles of view when the angle of view of the at least one camera is changed to an angle of view larger than the previously configured first angle of view, and may change again the angle of view of the at least one camera to the third angle of view that is one step larger than the second angle of view when it is determined that an optimal image capturing mode is difficult to be provided at the changed second angle of view. For another example, the electronic device 900 may change the angle of view to a second angle of view that is one step smaller than the third angle of view among the plurality of angles of view when the angle of view of the at least one camera is changed to an angle smaller than the previously configured third angle of view, and may change the angle of view to the first angle of view that is one step smaller than the second angle of view when it is determined that the optimal image capturing mode is difficult to be provided at the changed second angle of view.

Figure 10:
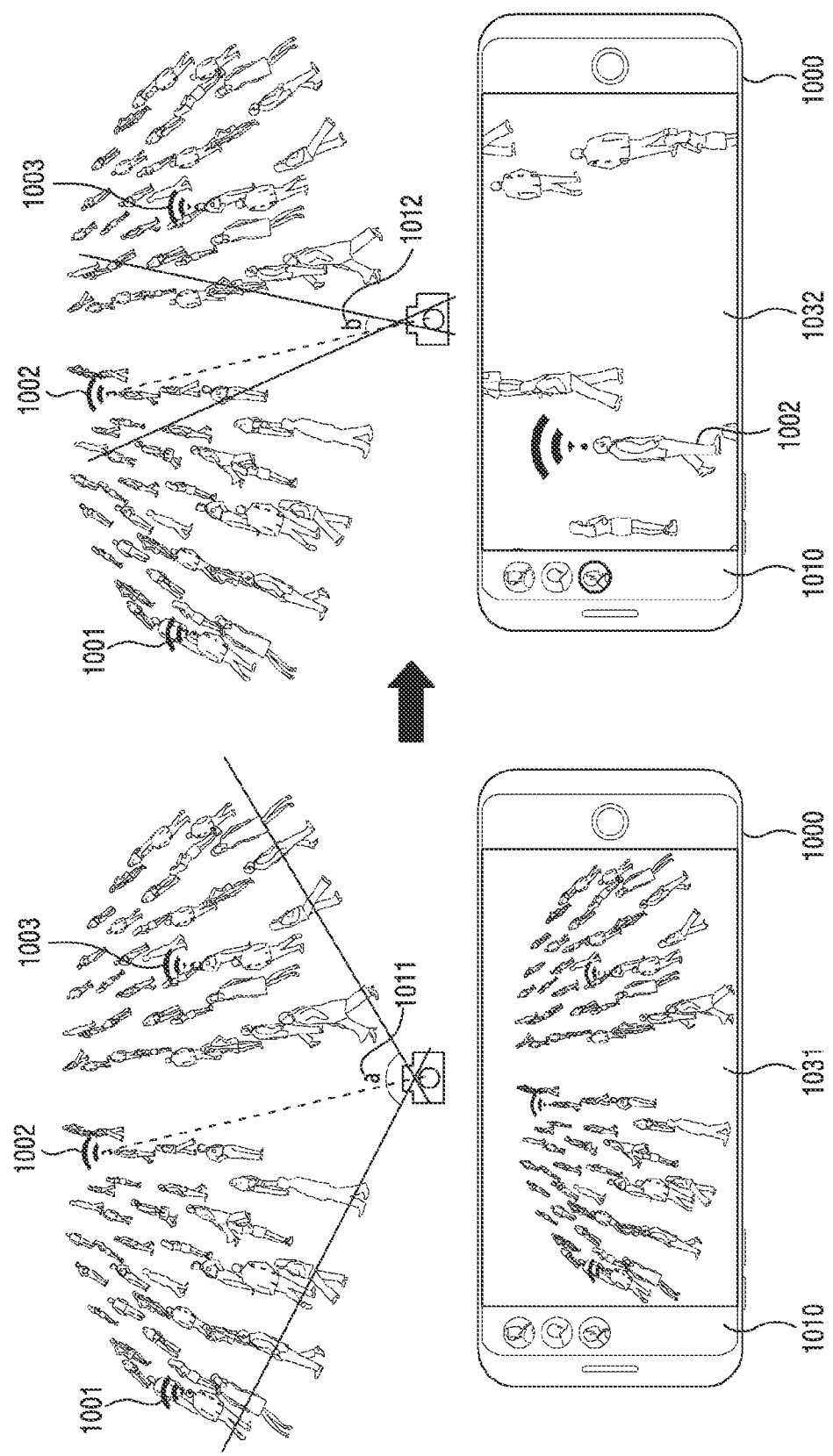
FIG. 10 is a diagram illustrating a change in an angle of view of a camera in a process of identifying the location of a subject through wireless communication according to an embodiment of the disclosure.

FIG. 10 is a diagram illustrating a change in an angle of view of a camera in a process of identifying a location of a subject through wireless communication according to an embodiment of the disclosure.

Referring to FIG. 10, an electronic device 1000 (e.g., the electronic device 200 of FIG. 2) may determine locations of external electronic devices based on signals received from the external electronic devices attached to or worn on a plurality of subjects (e.g., a first subject 1001, a second subject 1002, or a third subject 1003) through a communication circuit (e.g., the communication circuit 230 of FIG. 2) included in the electronic device 1000, and may identify locations of the plurality of subjects based on the locations of the external electronic devices.

According to an embodiment, in a process of determining the locations of the external electronic devices related to the plurality of subjects through the communication circuit (identifying the plurality of subjects), the electronic device 1000 may display, on a display 1010, a first preview image 1031 in which an area as wide as possible is captured through at least one camera (e.g., the camera 210 of FIG. 2) included in the electronic device 1000. For example, the electronic device 1000 may configure the angle of view of the at least one camera in a first angle range (e.g., angle range "a") 1011 including all of the plurality of subjects, and may capture the first preview image 1031 at the configured angle of view.

According to an embodiment, when the second subject 1002 that is a target to be captured among the plurality of subjects is selected, the electronic device 1000 may configure the angle of view of the at least one camera based on the location of the external electronic device related to the selected second subject 1002 and the information of the selected second subject 1002. For example, the electronic device 1000 may configure the angle of view of the at least one camera based on the location of the external electronic device related to the selected second subject 1002 and the size of the selected second subject 1002 included in the information of the selected second subject 1002. In addition, the electronic device 1000 may display a second preview image 1032 captured at the configured angle of view on the display 1010. The angle of view configured based on the location of the external electronic device related to the selected second subject 1002 and the size of the selected second subject 1002 may be configured in a second angle range (e.g., angle range "b") 1012 including the selected second subject 1002. The second angle range 1012 may further include an angle range considering a margin. For example, when the angle range including only the selected second subject 1002 is a first range (e.g., −8 degrees to 8 degrees), the second angle range 1012 may be configured as a second range (e.g., −12 degrees to 12 degrees) wider than the first range in consideration of the margin. According to an embodiment, the second angle range 1012 may be smaller than the first angle range 1011.

FIG. 11 is a diagram illustrating a method of configuring image capturing information of a camera according to an embodiment of the disclosure.

Referring to FIG. 11, an electronic device (e.g., the electronic device 200 of FIG. 2) may receive information of a subject related to an external electronic device from the external electronic device through a communication circuit (e.g., the communication circuit 230 of FIG. 2). The information of the subject may include profile information of the subject. The profile information of the subject may include at least one, for example, information of a type 1111 of the subject, information of a size 1112 of the subject, and information of a color 1113 of the subject. In addition, the electronic device may receive at least one of a location 1115 (location of the subject) of the external electronic device and movement information 1114 (movement information of the subject) of the external electronic device from the external electronic device through the communication circuit.

According to an embodiment, the electronic device may configure (or change) image capturing information of a camera (e.g., the camera 210 of FIG. 2) included in the electronic device based on at least one of the location 1115 of the external electronic device, the movement information 1114 of the external electronic device, and the information 1111, 1112, and 1113 of the subject. The image capturing information of the camera may include at least one of, for example, an angle of view 1131 of the camera, a shutter speed 1132 of the camera, ISO sensitivity 1133 of the camera, an exposure value 1134 of the camera, a filter type 1135 of the filter of the camera, and an aperture value 1136 of the camera. According to an embodiment, the angle of view 1131 of the camera may be configured to be a value corresponding to an angle of view 1137 obtained by Equation 1 described above.

The configuration values of the image capturing information of the camera according to the location 1115 of the external electronic device, the movement information 1114 of the external electronic device, and the information 1111, 1112, and 1113 of the subject defined in table shown in FIG. 11 are examples, and are not limited thereto.

Figure 12:
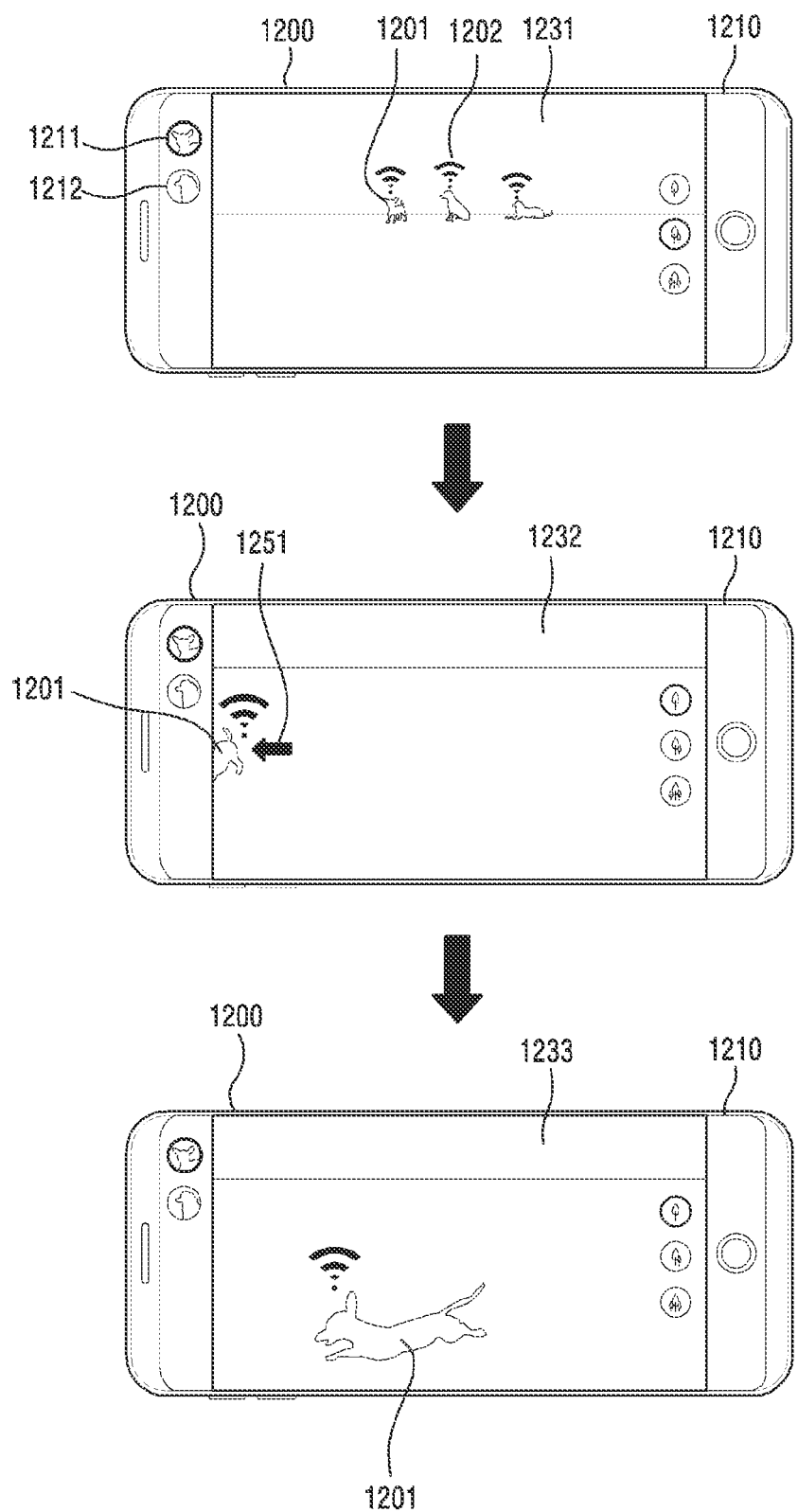
FIG. 12 is a diagram illustrating a method of guiding image capturing information of a camera according to the movement of a subject determined through wireless communication according to an embodiment of the disclosure.

FIG. 12 is a diagram illustrating a method of guiding image capturing information of a camera according to movement of a subject determined through wireless communication according to an embodiment of the disclosure.

Referring to FIG. 12, an electronic device 1200 (e.g., the electronic device 200 of FIG. 2) may determine a location of an external electronic device based on a signal received from the external electronic device attached to or worn on at least one subject 1201 or 1202 through a communication circuit (e.g., the communication circuit 230 of FIG. 2) included in the electronic device 1200, and may identify a location of the at least one subject 1201 or 1202 based on the location of the external electronic device.

According to an embodiment, in a process of determining the location of the external electronic device related to the at least one subject 1201 or 1202 through the communication circuit (identifying the at least one subject 1201 or 1202), the electronic device 1000 may display, on a display 1210, a first preview image 1231 in which an area as wide as possible is captured through at least one camera (e.g., the camera 210 of FIG. 2) included in the electronic device 1200. For example, the electronic device 1200 may acquire the first preview image 1231 by configuring the angle of view of the at least one camera to be a wide angle. In addition, the electronic device 1200 may display, on the display 1210, display objects 1211 and 1212 corresponding to the identified subjects 1201 and 1202.

According to an embodiment, when the location of the external electronic device related to the at least one subject 1201 is determined (the at least one subject 1201 is identified), the electronic device 1200 may configure image capturing information of the at least one camera based on the location of the external electronic device and the information of the subject 1201. For example, the electronic device 1200 may configure an angle of view of the at least one camera based on the location of the external electronic device and the size of the subject 1201 included in the information of the subject 1201. In addition, it is determined that the subject 1201 is moving based on the movement of the external electronic device, the electronic device 1200 may change the image capturing information of the at least one camera based on the movement information of the external electronic device. According to an embodiment, the electronic device 1200 may change the angle of view of the at least one camera based on a movement direction and a movement speed included in the movement information of the external electronic device. In addition, the electronic device 1200 may display a second preview image 1232 of the subject 1201 captured at the changed angle of view on the display 1210.

According to an embodiment, when it is determined that it is difficult to capture the subject 1201 even though the image capturing information of the at least one camera is changed according to the movement of the subject 1201, for example, when the entire body of the subject 1201 or at least a certain level of the body cannot be located within the angle of view of the at least one camera, the electronic device 1200 may display, on the display 1210, a display object 1251 guiding a capturing direction of the at least one camera based on the movement information of the external electronic device. For example, when it is determined that at least a portion of the subject 1201 is not included in the second preview image 1232, the electronic device 1200 may display, on the display 1210, the display object 1251 (e.g., arrow) guiding the user to move the capturing direction of the at least one camera based on the movement direction and movement speed included in the movement information of the external electronic device. Accordingly, the user may change the capturing direction of the at least one camera in a direction indicated by the display object 1251, so that the subject 1201 may be located within the angle of view of the at least one camera. In this case, the electronic device 1200 may display, on the display 1210, a third preview image 1233 of the subject 1201 captured using the at least one camera of which capturing direction is changed.

Figure 13:
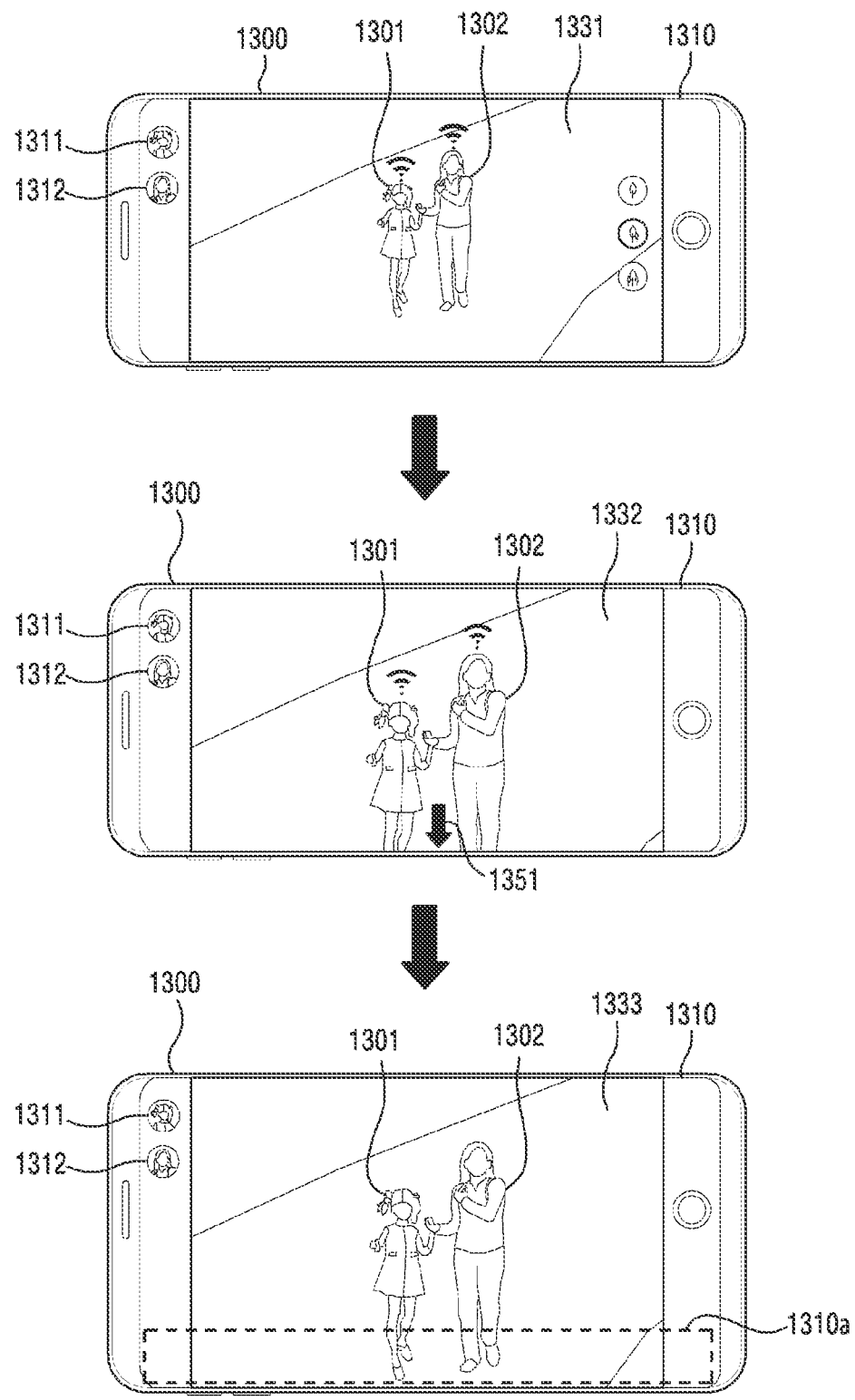
FIG. 13 is a diagram illustrating a method of changing a screen area of a display according to the movement of a subject determined through wireless communication according to an embodiment of the disclosure.

FIG. 13 is a diagram illustrating a method of changing a screen area of a display according to movement of a subject determined through wireless communication according to an embodiment of the disclosure.

Referring to FIG. 13, an electronic device 1300 (e.g., the electronic device 200 of FIG. 2) may determine a location of an external electronic device based on a signal received from the external electronic device attached to or worn on at least one subject 1301 or 1302 through a communication circuit (e.g., the communication circuit 230 of FIG. 2) included in the electronic device 1300, and may identify a location of the at least one subject 1301 or 1302 based on the location of the external electronic device.

According to an embodiment, in a process of determining the location of the external electronic device related to the at least one subject 1301 or 1302 through the communication circuit (identifying the at least one subject 1301 or 1302), the electronic device 1300 may display, on a display 1310, a first preview image 1331 in which an area as wide as possible is captured through at least one camera (e.g., the camera 210 of FIG. 2) included in the electronic device 1200. For example, the electronic device 1300 may acquire the first preview image 1331 by configuring the angle of view of the at least one camera to be a wide angle. In addition, the electronic device 1300 may display, on the display 1310, display objects 1311 and 1312 corresponding to the identified subjects 1301 and 1302.

According to an embodiment, when the location of the external electronic device related to the at least one subject 1301 or 1302 is determined (the at least one subject 1301 or 1302 is identified), the electronic device 1300 may configure image capturing information of the at least one camera based on the location of the external electronic device and the information of the subject 1301 or 1302. For example, the electronic device 1300 may configure an angle of view of the at least one camera based on the location of the external electronic device and the size of the subject 1301 or 1302 included in the information of the subject 1301 or 1302. In addition, when it is determined that the subject 1301 or 1302 is moving based on the movement of the external electronic device, the electronic device 1300 may change the image capturing information of the at least one camera based on the movement information of the external electronic device. According to an embodiment, the electronic device 1300 may change the angle of view of the at least one camera based on the movement direction and movement speed included in the movement information of the external electronic device. In addition, the electronic device 1300 may display, on the display 1310, a second preview image 1332 of the subject 1301 or 1302 captured at the changed angle of view.

According to an embodiment, when it is determined that it is difficult to capture the subject 1301 or 1302 even though the image capturing information of the at least one camera is changed according to the movement of the subject 1301 or 1302, for example, when the entire body of the subject 1301 or 1302 or at least a certain level of the body cannot be located within the angle of view of the at least one camera, the electronic device 1300 may display, on the display 1310, a display object 1351 guiding a capturing direction of the at least one camera based on the movement information of the external electronic device. For example, when it is determined that at least a portion of the subject 1301 or 1302 is not included in the second preview image 1332, the electronic device 1300 may display, on the display 1310, the display object 1351 (e.g., arrow) guiding the user to expand a screen area of the display 1310 based on the movement direction and movement speed included in the movement information of the external electronic device. Accordingly, the user may expand the screen area of the display 1310 in a direction indicated by the display object 1351, so that a third preview image 1333 in which the subject 1301 or 1302 is captured may be displayed on the entire screen area including an expanded screen area 1310a of the display 1310.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
memory storing one or more computer programs;
at least one camera; and
one or more processors communicatively coupled to the communication circuit, the memory, and the at least one camera,
wherein the one or more computer programs include computer-executable instructions that, when executed by the one or more processors individually or collectively, cause the electronic device to:
based on a first signal received through the communication circuit from at least one external electronic device, acquire information related to a location of the at least one external electronic device,
receive, from the at least one external electronic device through the communication circuit, information of a subject related to the at least one external electronic device, the information of the subject including size information of the subject, the size information including at least one of a horizontal length of the subject indicating a shoulder width of the subject, a vertical length of the subject indicating a height of the subject, or a diagonal length of the subject, and
based on the information related to the location of the at least one external electronic device and the information of the subject including the size information of the subject, configure image capturing information of the at least one camera.

2. The electronic device of claim 1, wherein
the one or more computer programs further include computer-executable instructions that, when executed by the one or more processors individually or collectively, cause the electronic device to:
based on the information related to the location of the at least one external electronic device and the size information of the subject, configure an angle of view included in the image capturing information.

3. The electronic device of claim 1,
wherein the at least one camera comprises a plurality of cameras having different angles of view, and
wherein the one or more computer programs further include computer-executable instructions that, when executed by the one or more processors individually or collectively, cause the electronic device to:
based on the information related to the location of the at least one external electronic device and the size information of the subject, select an angle of view for capturing the subject, and
select a camera corresponding to the selected angle of view among the plurality of cameras as a camera for capturing the subject.

4. The electronic device of claim 1, wherein the one or more computer programs further include computer-executable instructions that, when executed by the one or more processors individually or collectively, cause the electronic device to:
receive, from the at least one external electronic device through the communication circuit, movement information according to a change in the location of the at least one external electronic device, and based on the movement information of the at least one external electronic device, change the image capturing information of the at least one camera.

5. The electronic device of claim 1, wherein the one or more computer programs further include computer-executable instructions that, when executed by the one or more processors individually or collectively, cause the electronic device to:
based on a second signal received from the at least one external electronic device through the communication circuit, acquire movement information according to a change in the location of the at least one external electronic device, and
based on the movement information of the at least one external electronic device, change the image capturing information of the at least one camera.

6. The electronic device of claim 1, further comprising:
a display,
wherein the one or more computer programs further include computer-executable instructions that, when executed by the one or more processors individually or collectively, cause the electronic device to:
in response to receiving the first signal, display, on the display, a display object corresponding to the at least one external electronic device connected through the communication circuit, and
in response to receiving a selection of the display object, select the subject related to the at least one external electronic device corresponding to the display object as a capturing target.

7. The electronic device of claim 1, further comprising:
a display,
wherein the one or more computer programs further include computer-executable instructions that, when executed by the one or more processors individually or collectively, cause the electronic device to:
in case that the electronic device is connected to a plurality of external electronic devices through the communication circuit, display, on the display, a plurality of display objects corresponding to each of the plurality of external electronic devices, respectively, and
in case that at least one display object is selected among the plurality of display objects, select the subject related to the at least one external electronic device corresponding to the selected at least one display object as a capturing target.

8. The electronic device of claim 7, wherein the one or more computer programs further include computer-executable instructions that, when executed by the one or more processors individually or collectively, cause the electronic device to:
in case that the selected at least one display object comprises a plurality of display objects, acquire a size of a capturing area for capturing the capturing target based on information related to a location of each of the plurality of external electronic devices corresponding to the plurality of display objects and a size of each of the subjects related to the plurality of external electronic devices, respectively, and
based on the size of the capturing area, configure an angle of view included in the image capturing information.

9. The electronic device of claim 1, wherein the communication circuit is configured to support at least one of ultra-wideband (UWB) communication, wireless-fidelity (Wi-Fi) communication, wireless gigabit (WiGig) communication, bluetooth (BT) communication, or BT low energy (BLE) communication.

10. The electronic device of claim 1, further comprising:
a display,
wherein the one or more computer programs further include computer-executable instructions that, when executed by the one or more processors individually or collectively, cause the electronic device to:
in response to receiving the first signal, display, on the display, a display object corresponding to the at least one external electronic device connected through the communication circuit together with a preview image including the subject, and
wherein the display object is displayed outside of the preview image.

11. The electronic device of claim 1,
wherein the information of the subject further includes profile information of the subject, and
wherein the profile information of the subject includes at least one of information indicating a type of the subject, information of a phone number of the subject, information regarding a skin tone of the subject, or information regarding a type of filter preferred when the subject is captured.

12. An image capturing method performed by an electronic device by using wireless communication of the electronic device, the image capturing method comprising:
based on a first signal received from at least one external electronic device through a communication circuit of the electronic device, acquiring, by the electronic device, information related to a location of the at least one external electronic device;
receiving, by the electronic device from the at least one external electronic device through the communication circuit, information of a subject related to the at least one external electronic device, the information of the subject including size information of the subject, the size information including at least one of a horizontal length of the subject indicating a shoulder width of the subject, a vertical length of the subject indicating a height of the subject, or a diagonal length of the subject; and
based on the information related to the location of the at least one external electronic device and the information of the subject including the size information of the subject, configuring, by the electronic device, image capturing information of at least one camera included in the electronic device.

13. The image capturing method of claim 12, wherein the configuring of the image capturing information comprises:
based on the information related to the location of the at least one external electronic device and the size information of the subject, configuring, by the electronic device, an angle of view included in the image capturing information.

14. The image capturing method of claim 12,
wherein the at least one camera comprises a plurality of cameras having different angles of view, and
wherein the configuring of the image capturing information comprises:
based on the information related to the location of the at least one external electronic device and the size information of the subject, selecting, by the electronic device, an angle of view for capturing the subject; and selecting, by the electronic device, a camera corresponding to the selected angle of view among the plurality of cameras as a camera for capturing the subject.

15. The image capturing method of claim 12, further comprising:
receiving, by the electronic device from the at least one external electronic device through the communication circuit, movement information according to a change in the location of the at least one external electronic device; and
based on the movement information of the external electronic device, changing, by the electronic device, the image capturing information of the at least one camera.

16. The image capturing method of claim 12, further comprising:
based on a second signal received by the electronic device from the at least one external electronic device through the communication circuit, acquiring, by the electronic device, movement information according to a change in the location of the at least one external electronic device; and
based on the movement information of the at least one external electronic device, changing, by the electronic device, image capturing information of the at least one camera.

17. The image capturing method of claim 12, further comprising:
in response to receiving the first signal, displaying, by the electronic device on a display of the electronic device, a display object corresponding to the at least one external electronic device connected through the communication circuit; and
in response to a selection of the display object, selecting, by the electronic device, the subject related to the at least one external electronic device corresponding to the selected display object as a capturing target.

18. The image capturing method of claim 12, further comprising:
in case that the electronic device is connected to a plurality of external electronic devices through the communication circuit, displaying, by the electronic device on a display of the electronic device, a plurality of display objects corresponding to each of the plurality of external electronic devices, respectively; and
in case that at least one display object is selected among the plurality of display objects, selecting, by the electronic device, the subject related to the at least one external electronic device corresponding to the selected at least one display object as a capturing target.

19. The image capturing method of claim 18, further comprising:
in case that the selected at least one display object comprises a plurality of display objects, acquiring, by the electronic device, a size of a capturing area for capturing the capturing target based on information related to a location of each of the plurality of external electronic devices corresponding to the plurality of display objects and a size of each of the subjects related to the plurality of external electronic devices, respectively; and
based on the size of the capturing area, configuring, by the electronic device, an angle of view included in the image capturing information.

20. The image capturing method of claim 12, wherein the communication circuit is configured to support at least one of ultra-wideband (UWB) communication, wireless-fidelity (Wi-Fi) communication, wireless gigabit (WiGig) communication, bluetooth (BT) communication, or BT low energy (BLE) communication.

* * * * *